US012594643B2

(12) United States Patent
Sugiura et al.

(10) Patent No.: US 12,594,643 B2
(45) **Date of Patent: *Apr. 7, 2026**

(54) TOOL

(71) Applicant: MAKITA CORPORATION, Anjo (JP)

(72) Inventors: Shin Sugiura, Anjo (JP); Takafumi Kotsuji, Anjo (JP); Ryosuke Otani, Anjo (JP); Fumiyoshi Saito, Anjo (JP)

(73) Assignee: MAKITA CORPORATION, Anjo (JP)

( * ) Notice: Subject to any disclaimer, the term of this patent is extended or adjusted under 35 U.S.C. 154(b) by 461 days.

This patent is subject to a terminal disclaimer.

(21) Appl. No.: 17/914,880

(22) PCT Filed: Apr. 8, 2021

(86) PCT No.: PCT/JP2021/014893

§ 371 (c)(1),
(2) Date: Sep. 27, 2022

(87) PCT Pub. No.: WO2021/206140

PCT Pub. Date: Oct. 14, 2021

(65) Prior Publication Data

US 2023/0119351 A1 Apr. 20, 2023

(30) Foreign Application Priority Data

Apr. 10, 2020 (JP) ................................ 2020-071242

(51) Int. Cl.

*B24B 23/02* (2006.01)
*B24B 55/05* (2006.01)
*B25F 5/02* (2006.01)

(52) U.S. Cl.

CPC .......... *B24B 23/028* (2013.01); *B24B 55/052* (2013.01); *B25F 5/026* (2013.01)

(58) Field of Classification Search

CPC ..... B24B 23/028; B24B 23/02; B24B 23/022; B24B 23/005; B24B 23/04; B24B 55/052;
(Continued)

(56) References Cited

U.S. PATENT DOCUMENTS 5,974,611 A 11/1999 Casella
8,087,977 B2 1/2012 Gallagher
(Continued)

FOREIGN PATENT DOCUMENTS

CN 108367409 A 8/2018
JP S51-114787 U 9/1976
(Continued)

OTHER PUBLICATIONS

Jun. 8, 2021 International Search Report issued in International Patent Application No. PCT/JP2021/014893.
(Continued)

*Primary Examiner* — Michael A Gump
(74) *Attorney, Agent, or Firm* — Oliff PLC

(57) ABSTRACT

A tool includes a first accessory, at least two first attachment portions for detachably and selectively attaching the first accessory, and a single first intermediate member provided in common for the at least two first attachment portions. The first intermediate member includes at least one pressed portion configured to, when the first accessory is attached to one first attachment portion arbitrarily selected from the at least two first attachment portions, be directly or indirectly pressed by the first accessory. The first intermediate member is configured to be displaced when the at least one pressed portion is pressed. The tool further includes a single first sensor configured to detect that the first intermediate member is displaced.

21 Claims, 20 Drawing Sheets

(58) Field of Classification Search

CPC ....... B24B 55/04; B24B 55/05; B24B 55/055; B24B 55/057; B24B 49/10; B24B 49/12; B24B 47/00; B24B 47/12; B24B 47/26; B25F 5/026; B25F 5/02; B25F 5/024; B23Q 11/0085; B23Q 11/08; H01H 9/06; H01H 9/16; H01H 9/20; H01H 9/22; H01H 9/24; H01H 9/26; H01H 2300/024; H02P 1/022

USPC ................. 451/359; 192/129 R, 130, 129 A; 74/543

See application file for complete search history.

(56) References Cited

U.S. PATENT DOCUMENTS

| | | | | |
|---|---|---|---|---|
| 12,194,596 | B2 * | 1/2025 | Mizutani | B24B 23/028 |
| 2002/0100597 | A1 | 8/2002 | Numata | |
| 2005/0161241 | A1 * | 7/2005 | Frauhammer | B25F 5/026 173/1 |
| 2011/0114345 | A1 * | 5/2011 | Schlesak | B25D 17/00 173/1 |
| 2014/0231113 | A1 * | 8/2014 | Steurer | B25F 5/00 173/1 |
| 2017/0348843 | A1 | 12/2017 | Barth et al. | |
| 2018/0272494 | A1 * | 9/2018 | Schadow | B25F 5/026 |
| 2018/0281146 | A1 * | 10/2018 | Tomonaga | B24B 49/10 |
| 2018/0326554 | A1 | 11/2018 | Schadow et al. | |
| 2020/0055159 | A1 | 2/2020 | Sakai et al. | |
| 2023/0158630 | A1 * | 5/2023 | Ishikawa | B24B 23/02 451/359 |

FOREIGN PATENT DOCUMENTS

| | | | | |
|---|---|---|---|---|
| JP | S58-055847 | U | 4/1983 | |
| JP | H10-510210 | A | 10/1998 | |
| JP | 2012-061541 | A | 3/2012 | |
| JP | 2013-233637 | A | 11/2013 | |
| WO | 2017/051892 | A1 | 3/2017 | |
| WO | 2017/051893 | A1 | 3/2017 | |
| WO | 2018/180083 | A1 | 10/2018 | |
| WO | WO-2020054631 | A1 * | 3/2020 | B24B 23/005 |

OTHER PUBLICATIONS

Oct. 6, 2022 International Preliminary Report on Patentability issued in International Patent Application No. PCT/JP2021/014893.

Jun. 8, 2021 International Search Report issued in International Patent Application No. PCT/JP2021/014673.

Oct. 6, 2022 International Preliminary Report on Patentability issued in International Patent Application No. PCT/JP2021/014673.

Dec. 20, 2024 Office Action issued in Chinese Patent Application No. 202180026069.X.

U.S. Appl. No. 17/912,697, filed Sep. 19, 2022 in the name of Ishikawa et al.

May 9, 2025 Office Action issu.ed in U.S. Appl. No. 17/912,697.

Jan. 1, 2025 Office Action issued in Chinese Patent Application No. 202180026601.8.

Jul. 23, 2025 Office Action issued in Chinese Patent Application No. 202180026601.8.

Jan. 27, 2026 Office Action issued in U.S. Appl. No. 17/912,697.

* cited by examiner

TOOL

TECHNICAL FIELD

The present invention relates to a tool configured to allow an accessory to be detachably attached thereto.

BACKGROUND

Various kinds of accessories may be detachably attached to a tool. For example, in the case of a grinder including a tool accessory configured to be rotationally driven, a side handle is prepared as a detachably attachable accessory therefor. The side handle is attached to be held by the other hand of a user when the user holds a handle of the grinder with one of his/her hands.

For such a grinder, there is a demand for preventing the grinder from being used in a state that the accessory is not attached. For example, the following patent literature, PTL 1 discloses a grinder including a sensor that detects whether a side handle is attached.

CITATION LIST

[PTL 1] US Patent Application Publication No. 2018/272494

SUMMARY

Technical Problem

However, normally, the grinder is configured to allow the side handle to be selectively attached to a plurality of portions. Providing an individual sensor for each of the attachment portions of the side handle leads to an increase in the number of components and an increase in the cost. Especially, a large-size grinder has three attachment portions, and therefore this problem becomes noticeable. Such a problem is not limited to the grinder, and lies in common for any tool that detects whether the accessory is selectively attached to any of the plurality of portions. Under these circumstances, it is desired, in a tool configured to allow an accessory to be selectively attached to a plurality of portions, to reduce the number of sensors for detecting whether the accessory is attached.

Solution to Problem

The present specification discloses a tool. This tool may include a first accessory, at least two first attachment portions for detachably and selectively attaching the first accessory, and a single first intermediate member provided in common for the at least two first attachment portions. The first intermediate member may include at least one pressed portion configured to, when the first accessory is attached to one first attachment portion arbitrarily selected from the at least two first attachment portions, be directly or indirectly pressed by the first accessory. The first intermediate member may be configured to be displaced when the at least one pressed portion is pressed. The tool may further include a single first sensor configured to detect that the first intermediate member is displaced.

According to this tool, the single intermediate member provided in common for the at least two first attachment portions is displaced regardless of which first attachment portion is used to attach the first accessory among the at least two first attachment portions. Therefore, this displacement of the first intermediate member can be detected using the single first sensor. In other words, this configuration eliminates the necessity of individually mounting a sensor for detecting whether the accessory is attached for each of the at least two first attachment portions, and therefore can reduce the number of sensors.

DESCRIPTION OF EMBODIMENTS

Figure 1:
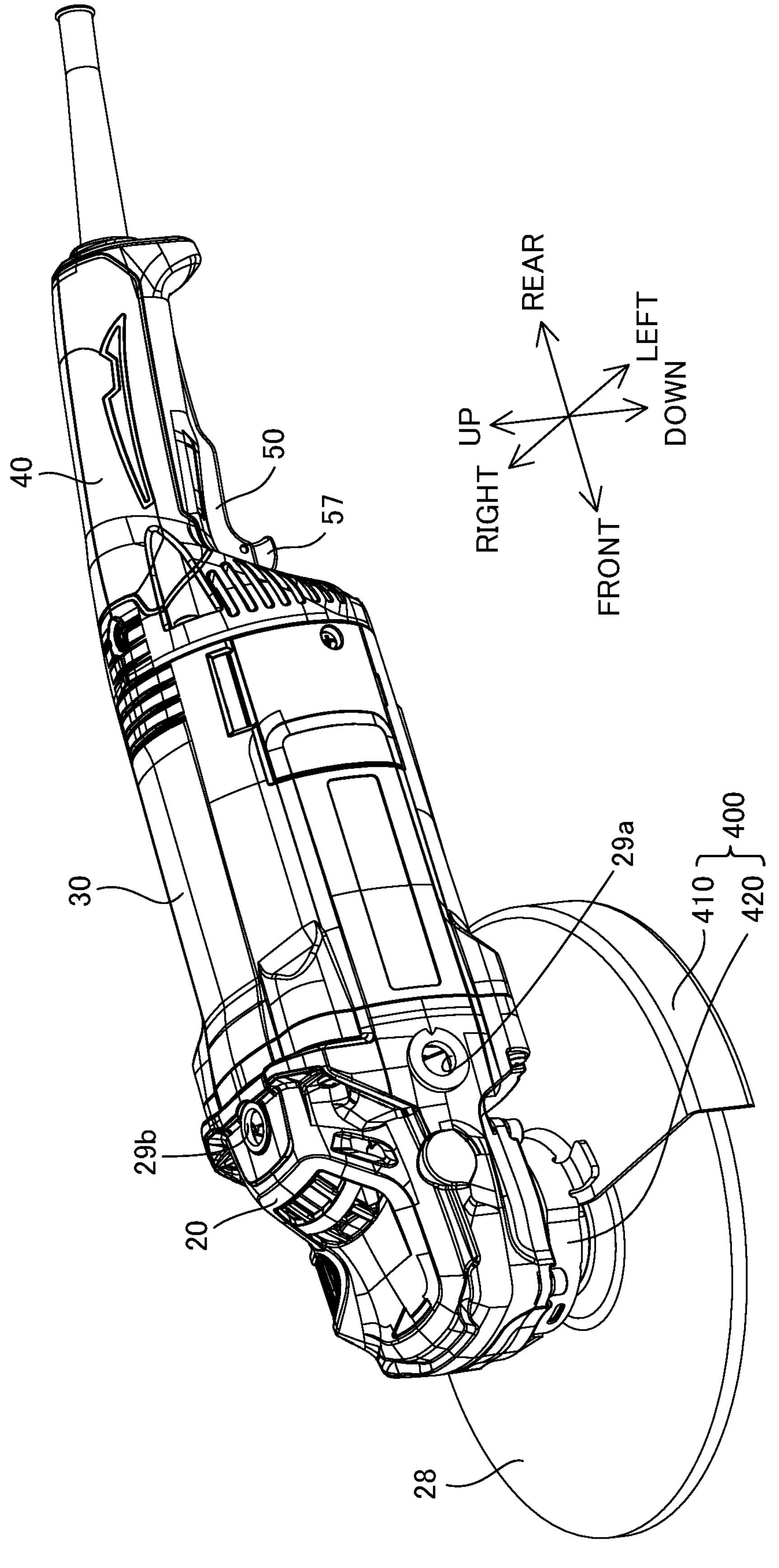
FIG. 1 is a perspective view of a grinder according to a first embodiment of the present invention, and illustrates a state in which a side grip is detached.

In one or more embodiment(s), a tool may include a first accessory, at least two first attachment portions for detachably and selectively attaching the first accessory, and a single first intermediate member provided in common for the at least two first attachment portions. The first intermediate member may include at least one pressed portion configured to, when the first accessory is attached to one first attachment portion arbitrarily selected from the at least two first attachment portions, be directly or indirectly pressed by the first accessory. The first intermediate member may be configured to be displaced when the at least one pressed portion is pressed. The tool may further include a single first sensor configured to detect that the first intermediate member is displaced.

According to this tool, the single intermediate member provided in common for the at least two first attachment portions is displaced regardless of which first attachment portion is used to attach the first accessory among the at least two first attachment portions. Therefore, this displacement of the first intermediate member can be detected using the single first sensor. In other words, this configuration eliminates the necessity of individually mounting a sensor for detecting whether the accessory is attached for each of the at least two first attachment portions, and therefore can reduce the number of sensors.

In one or more embodiment(s), the tool may include a biasing member configured to bias the first intermediate member toward a position at which the first intermediate member is located when being not pressed directly or indirectly by the first accessory. According to this configuration, the first intermediate member can automatically return to the position before the displacement under the biasing force of the biasing member when the first accessory is detached.

In one or more embodiment(s), the at least one pressed portion may include a pressed surface angled with respect to a pressing direction in such a manner that the first intermediate member is displaced in a direction different from the pressing direction. The pressing direction may be a direction in which the first accessory directly or indirectly presses the at least one pressing target portion. According to this configuration, the first intermediate member can be easily displaced in a desired direction.

In one or more embodiment(s), the first intermediate member may include a first intermediate member main body having an annular shape or a partially annular shape. The at least two first attachment portions may be disposed at positions spaced apart from each other in a circumferential direction of the annular shape or the partially annular shape, respectively. According to this configuration, the first intermediate member is shaped so as to correspond to the layout of the at least two first attachment portions, and therefore the single first intermediate member can be used in common for the at least two first attachment portions with a simple structure.

In one or more embodiment(s), the at least one pressed portion may include pressed portions respectively provided at at least two positions respectively corresponding to positions of the at least two first attachment portions. According to this configuration, the at least one pressed portion is disposed only at necessary portions and therefore the at least one pressed portion can be formed in a compact size compared to when the at least one pressed portion is formed as a continuous single portion.

In one or more embodiment(s), the at least one pressed portion may protrude radially outward from the first intermediate member main body. According to this configuration, the first intermediate member is easily shaped so as to be directly or indirectly pressed by the first accessory. Further, the diameter of the first intermediate member main body can be reduced.

In one or more embodiment(s), the first intermediate member may be configured to be rotated in the circumferential direction when the at least one pressed portion is pressed. According to this configuration, the first intermediate member can be easily displaced. Further, this configuration eliminates the necessity for securing a space for the displacement of the first intermediate member in the direction in which the rotational axis of the first intermediate member extends, thereby allowing the tool to have a compact size in this direction.

In one or more embodiment(s), the first intermediate member main body may include a cutout portion partially cut out along the circumferential direction. The biasing member may be contained in the cutout portion. According to this configuration, the tool is prevented from increasing in size due to the installation of the biasing member.

In one or more embodiment(s), the first intermediate member may include a tilt axis. The first intermediate member may be configured to be tilted about the tilt axis when the at least one pressed portion is pressed.

In one or more embodiment(s), the first intermediate member may include a first magnet and a magnet holding portion that holds the first magnet. The first sensor may be a magnetic sensor configured to detect a displacement of the first magnet.

In one or more embodiment(s), the magnet holding portion may protrude radially outward from the first intermediate member main body. According to this configuration, in the case where the first intermediate member is configured to be rotated, the distance from the rotational axis of the first intermediate member to the first magnet can be increased. Therefore, this configuration leads to an increase in the displacement amount of the first magnet with respect to the same rotational angle of the first intermediate member, and therefore can easily secure the detection accuracy of the magnetic sensor as a result thereof.

In one or more embodiment(s), the magnet holding portion may be provided at a position different from the at least one pressed portion in the circumferential direction. According to this configuration, the magnet holding portion can be formed at any circumferential position other than the position of the at least one pressed portion, and therefore the layout flexibility of the magnetic sensor is improved. In other words, the layout of the magnetic sensor can be determined without increasing the tool size.

In one or more embodiment(s), the tilt axis may be located on a radially outer side with respect to the first intermediate member main body. The first magnet may be disposed on the radially outer side with respect to the first intermediate member main body and at a position generally opposite to the tilt axis with respect to the first intermediate member main body. According to this configuration, the distance from the tilt axis of the first intermediate member to the first magnet can be increased. In other words, this configuration can increase the displacement amount of the first magnet with respect to the same tilt angle of the first intermediate member. As a result, this configuration can easily secure the detection accuracy of the magnetic sensor.

In one or more embodiment(s), the magnetic sensor and the first magnet may be disposed in such a manner that the magnetic sensor and the first magnet face each other in a direction in which the tilt axis extends. According to this configuration, the displacement of the first magnet can be accurately detected using a magnetic sensor operational for an alternating magnetic field.

In one or more embodiment(s), the first sensor may be a microswitch. The first intermediate member may include a contact portion for contacting the microswitch to bring the microswitch into an ON state when the first intermediate member is displaced.

In one or more embodiment(s), the contact portion may be provided at a position different from the at least one pressed portion in the circumferential direction. According to this configuration, the contact portion can be formed at any circumferential position other than the position of the at least one pressed portion, and therefore the layout flexibility of the microswitch is improved. In other words, the layout of the microswitch can be determined without increasing the tool size.

In one or more embodiment(s), the tool may include a second accessory, a second attachment portion for detachably attaching the second accessory, a second intermediate member configured to, when the second accessory is attached to the second attachment portion, be pivotally moved by being directly or indirectly pressed by the second accessory, and a second sensor configured to detect that the second intermediate member is pivotally moved. According to this configuration, whether the second accessory is attached can also be detected.

In one or more embodiment(s), the second intermediate member may include a second magnet. The second sensor may be a magnetic sensor configured to detect a displacement of the second magnet.

In one or more embodiment(s), the tool may include an electric motor, and a controller configured to control driving of the electric motor. The controller may be configured to permit the electric motor to be driven when both a first condition and a second condition are satisfied. The first condition may be a condition that the first sensor detects that the first accessory is attached to any of the at least two first attachment portions. The second condition may be a condition that the second sensor detects that the second accessory is attached to the second attachment portion. The controller may be further configured to prohibit the electric motor from being driven when at least one of the first condition and the second condition is not satisfied.

In one or more embodiment(s), the tool may include a bearing configured to rotatably support a motor shaft of the electric motor, and a housing including a hollow circular cylindrical portion containing and supporting the bearing. The first intermediate member may be disposed in such a manner that the first intermediate member main body surrounds an outer periphery of the hollow circular cylindrical portion. According to this configuration, the tool does not have to include a special member to support the first intermediate member, and can be configured with a compact size.

In one or more embodiment(s), the tool may be a grinder including a tool accessory configured to be rotated by the electric motor. The first accessory may be a side grip. The second accessory may be a cover that partially covers the tool accessory.

In the following description, the embodiments of the present invention will be described in further detail with reference to the drawings.

A. First Embodiment

In the following description, a first embodiment of the present invention will be described with reference to FIGS. 1 to 9. In the following embodiments, a handheld-type electric disk grinder (hereinafter simply referred to as a grinder) 10 will be cited as an example of the tool.

Figure 4:
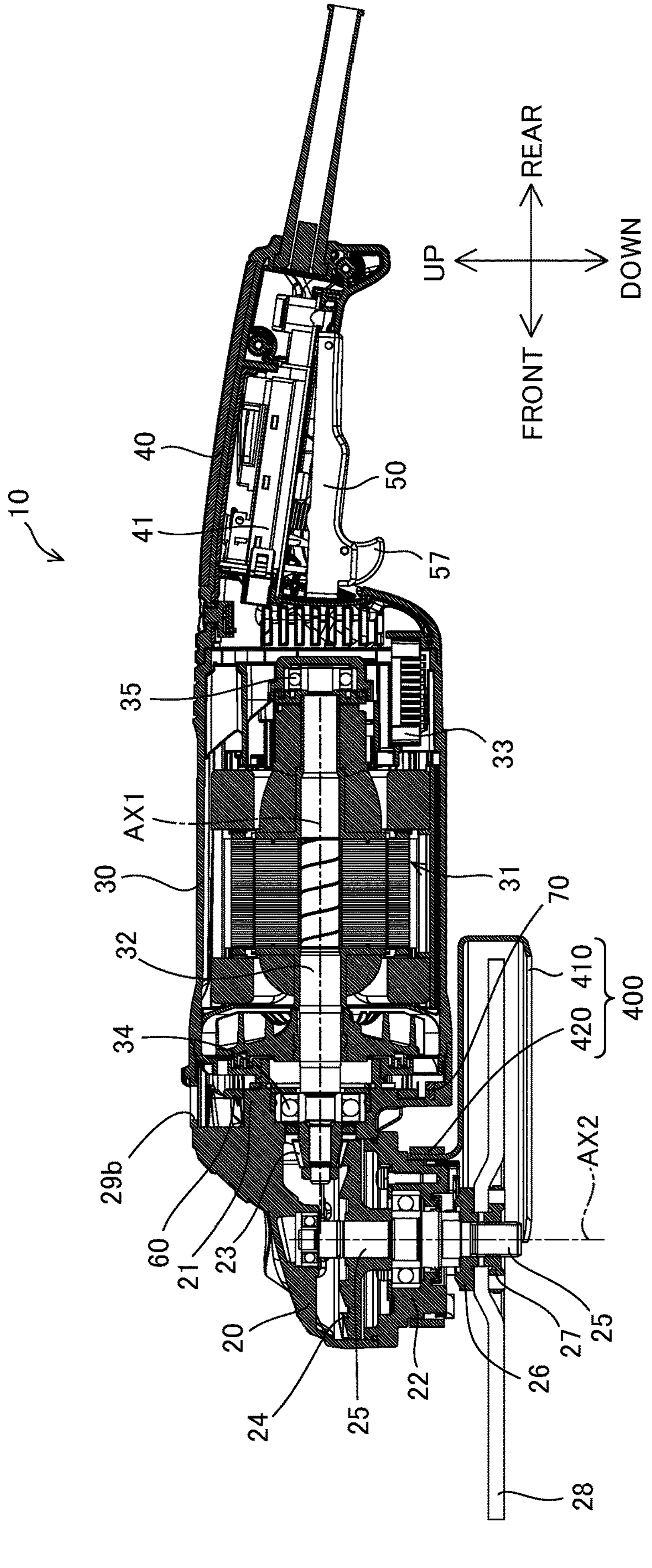
FIG. 4 is a vertical cross-sectional view of the grinder, and illustrates the state in which the side grip is detached.

First, the grinder 10 will be described in outline with reference to FIGS. 1 to 4. As illustrated in FIG. 4, the grinder 10 is configured to rotationally drive a generally disk-shaped tool accessory 28 mounted around a spindle 25. The spindle 25 is rotated by a rotational driving force provided from an electric motor 31. A grinding stone, a rubber pad, a brush, a blade, and the like are prepared as the tool accessory 28 mountable to the grinder 10. A user selects the appropriate tool accessory 28 according to desired processing work and mounts it to the grinder 10. According to the grinder 10, processing work such as grinding, polishing, and cutting can be performed on a processing target material according to the type of the tool accessory 28.

In the following description, a direction in which a rotational axis AX1 of the electric motor 31 (i.e., a motor shaft 32) extends is defined to be a front-rear direction of the grinder 10. One side in the front-rear direction on which the tool accessory 28 is located is defined to be a front side, and the opposite side therefrom is defined to be a rear side. Further, a direction in which a rotational axis AX2 of the spindle 25 (i.e., a rotational axis of the tool accessory 28) extends is defined to be a vertical direction of the grinder 10. One side in the vertical direction on which the tool accessory 28 is located is defined to be a lower side, and the opposite side therefrom is defined to be an upper side. Further, a direction perpendicular to the vertical direction and the front-rear direction is defined to be a left-right direction of the grinder 10. A right side in the left-right direction when the front side is viewed from the rear side is defined to be a right side of the grinder 10, and the opposite side therefrom is defined to be a left side of the grinder 10.

As illustrated in FIGS. 1 to 4, the grinder 10 includes a gear housing 20, a motor housing 30, and a handle housing 40. As illustrated in FIG. 4, the electric motor 31 is contained in the motor housing 30, which is located between the gear housing 20 and the handle housing 40 in the front-rear direction, i.e., the longitudinal direction of the grinder 10. The electric motor 31 is rotationally supported via a bearing 34 contained in the gear housing 20 and a bearing 35 contained in the motor housing 30 near the read edge of the motor housing 30. The electric motor 31 is driven by electric power supplied from outside (alternating-current power in the present embodiment, but may be direct-current power).

As illustrated in FIG. 4, a controller 33 is further contained in the motor housing 30 near the rear edge and the lower edge of the motor housing 30. The controller 33 controls the driving of the electric motor 31 by controlling the electric power supplied to the electric motor 31. The controller 33 is located adjacent to the electric motor 31 in the front-rear direction, and is disposed behind the electric motor 31.

A mechanism for transmitting the rotational driving force of the electric motor 31 to the tool accessory 28 is contained in the gear housing 20. More specifically, a small bevel gear 23, a large bevel gear 24, and the spindle 25 are contained in the gear housing 20. The small bevel gear 23 is fixed around the motor shaft 32 at the front end portion of the motor shaft 32 of the electric motor 31. The spindle 25 is supported rotatably about the rotational axis AX2 via bearings disposed so as to be vertically spaced apart from each other. The rotational axis AX2 intersects with (more specifically, intersects perpendicularly to) the rotational axis AX1 of the electric motor 31. The large bevel gear 24 is fixed around the spindle 25 on the upper side of the spindle 25, and is meshed with the small bevel gear 23. The gear housing 20 includes a second attachment portion 22 at the lower edge portion thereof. The second attachment portion 22 is used to detachably attach a cover 400. The second attachment portion 22 has a vertically extending hollow circular cylindrical shape. The spindle 25 extends vertically in the gear housing 20, and extends out of the gear housing 20 (more specifically, the second attachment portion 22) on the lower side.

An inner flange 26 is attached around the spindle 25 at the lower end portion of the spindle 25 extending out of the gear housing 20. A male screw portion is formed on a lower portion of the spindle 25 with respect to the inner flange 26, and a lock nut 27 is attached to this male screw portion. The position of the tool accessory 28 relative to the spindle 25 is fixed by interposing the tool accessory 28 between the inner flange 26 and the lock nut 27 and tightening the lock nut 27.

The gear housing 20 includes a hollow circular cylindrical portion 21 at the rear edge thereof. The hollow circular cylindrical portion 21 extends in the front-rear direction. The above-described bearing 34 is contained in the hollow circular cylindrical portion 21 and is supported by the hollow circular cylindrical portion 21.

The handle housing 40 is a portion to be held by the user with one of his/her hands when the grinder 10 is in use. The handle housing 40 has a hollow circular cylindrical shape extending generally in the front-rear direction. A switch 41 for driving the electric motor 31 is contained inside the handle housing 40. An operation member 50 is provided under the handle housing 40. The operation member 50 is configured to be displaceable between an OFF position of bringing the switch 41 into an OFF state and an ON position of bringing the switch 41 into an ON state. A lock-off switch 57 is provided near the front end of the operation member 50 in the front-rear direction. The lock-off switch 57 is used to engage the operation member 50 at the OFF position, thereby prohibiting the operation member 50 from being displaced to the ON position.

When the operation member 50 is operated from the OFF position to the ON position by the user, the switch 41 detects that and transmits a detection signal to the controller 33. Upon receiving this detection signal, the controller 33 supplies the electric power to the electric motor 31, thereby driving the electric motor 31. When the electric motor 31 is driven, the rotation of the motor shaft 32 is transmitted to the spindle 25 while being slowed down via the small bevel gear 23 and the large bevel gear 24. At this time, the direction of the rotational motion is converted from the direction around the motor shaft 32 into the direction around the rotational axis AX2 of the spindle 25. According to this mechanism, the spindle 25 is rotated about the rotational axis AX2 in response to the rotation of the motor shaft 32, and the tool accessory 28 fixed by the inner flange 26 and the lock nut 27 is rotated together with the spindle 25 as a result thereof.

As illustrated in FIG. 1, the grinder 10 further includes a side handle 300 and the cover 400 as the accessories thereof. The side handle 300 is prepared to be held by the user with the opposite hand from his/her hand holding the handle housing 40. The user can further stably hold the grinder 10 by using the side handle 300. The side handle 300 includes a grip portion 310 to be held by the user, and an attachment portion 320 to be attached to the gear housing 20. The attachment portion 320 has a circular columnar shape extending in the longitudinal direction of the side handle 300, and extends out of one end of the grip portion 310 in the longitudinal direction of the side handle 300. A male screw is formed on the outer peripheral surface of the attachment portion 320.

Figure 2:
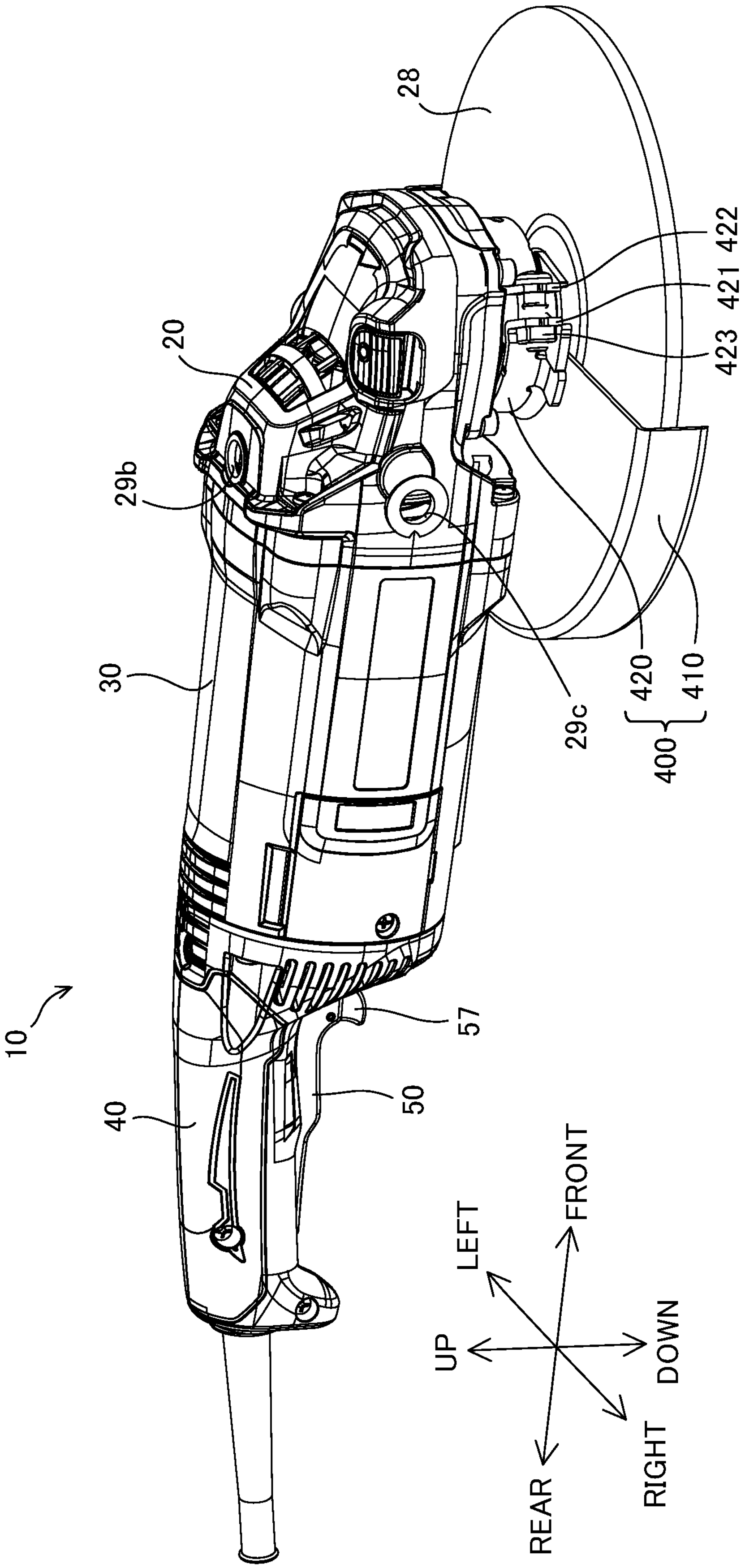
FIG. 2 is a perspective view of the grinder, and illustrates the state in which the side grip is detached.
Figure 3:
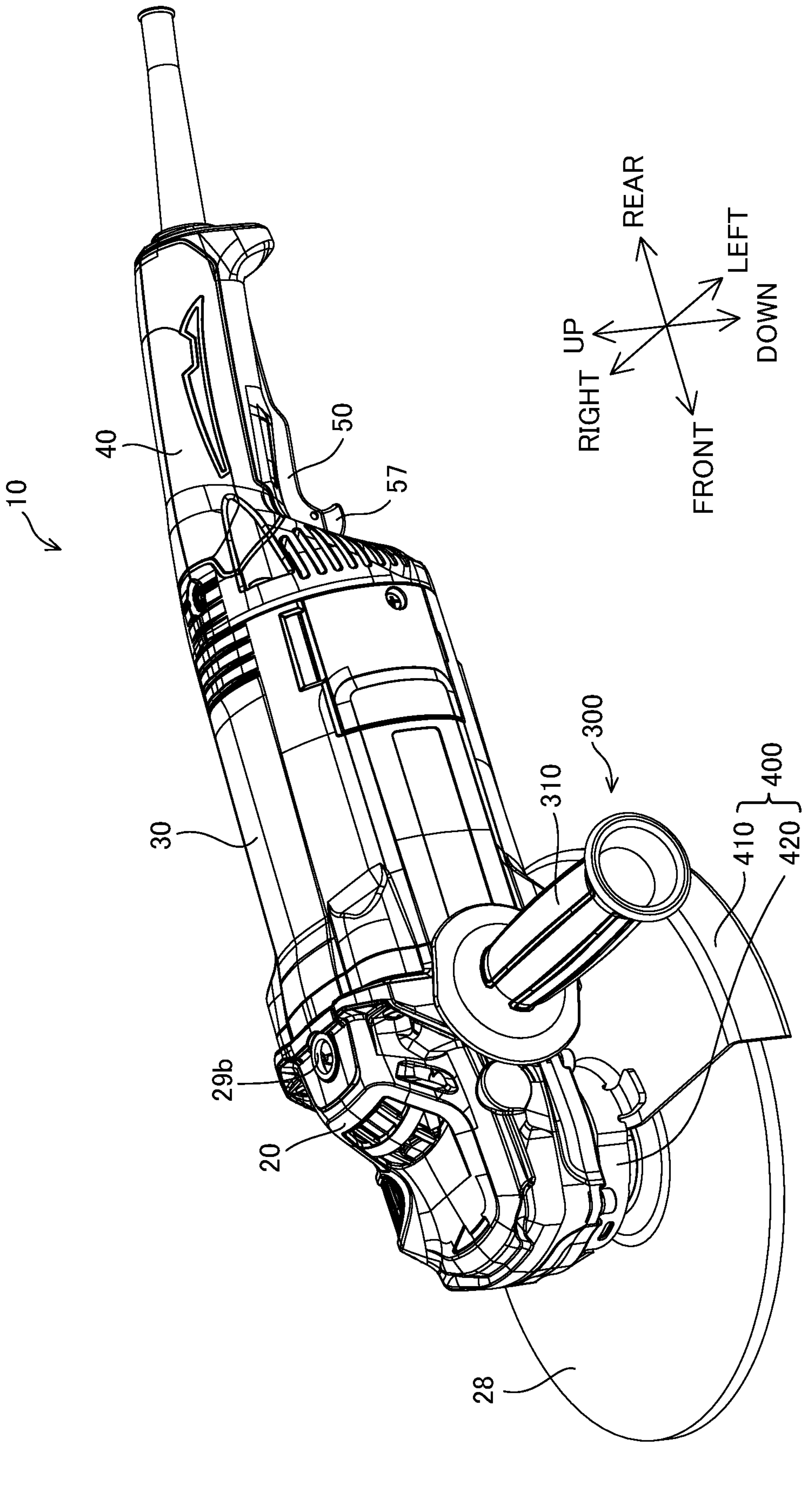
FIG. 3 is a perspective view of the grinder, and illustrates a state in which the side grip is attached.

As illustrated in FIGS. 1 and 2, the gear housing 20 includes three first attachment portions 29*a* to 29*c* for detachably attaching the side handle 300. The first attachment portions 29*a* to 29*c* are disposed at positions spaced apart from each other in the circumferential direction around the rotational axis AX1. More specifically, the first attachment portion 29*a* is formed on the left surface of the gear housing 20, the first attachment portion 29*b* is formed on the upper surface of the gear housing 20, and the first attachment portion 29*c* is formed on the right surface of the gear housing 20. The three first attachment portions 29*a* to 29*c* are provided at positions rotational symmetric with respect to the rotational axis AX1, respectively. Each of the first attachment portions 29*a* to 29*c* is in the form of a through-hole that establishes communication between the inside and the outside of the gear housing 20. A female screw threadedly engageable with the male screw of the attachment portion 320 is formed on the inner surface forming this through-hole.

The side handle 300 can be attached to the gear housing 20 by screwing the attachment portion 320 of the side handle 300 into one selected from the three first attachment portions 29*a* to 29*c*. The user can arbitrarily select the attachment portion of the side handle 300 from the first attachment portions 29*a* to 29*c* according to the type of the work intended to perform using the grinder 10 or according to whether the user is right-handed or left-handed. The three first attachment portions 29*a* to 29*c* are provided in the present embodiment, but the number of first attachment portions is not especially limited and may be two or may be four or more. For example, the grinder 10 may include only two first attachment portions 29*a* and 29*c*.

As illustrated in FIG. 1, the cover 400 includes a cover main body 410 to cover a part of the tool accessory 28 therewith, and an attachment portion 420 to be attached to the second attachment portion 22. The cover main body 410 covers an approximately rear half portion of the tool accessory 28. The cover main body 410 covers the upper surface and the circumferential surface of the tool accessory 28 in the present embodiment, but may cover the upper surface, the lower surface, and the circumferential surface between the upper surface and the lower surface depending on the type of the tool accessory 28 in use. The attachment portion 420 has a generally annular shape with an opening, and extends upward from the upper surface of the cover main body 410. As illustrated in FIG. 2, the attachment portion 420 includes two flanges 421 and 422 facing each other at two distal ends in the circumferential direction. A bolt 423 is inserted into screw holes formed at the flanges 421 and 422 and is tightened in a state that the attachment portion 420 is disposed so as to surround the second attachment portion 22 of the gear housing 20, by which the radius of the annular shape of the attachment portion 420 reduces and the attachment portion 420 is fixed to the second attachment portion 22.

The above-described grinder 10 can drive the electric motor 31 only in a state that the side handle 300 is attached to any of the first attachment portions 29*a* to 29*c* of the gear housing 20. In a state that the side handle 300 is not attached, the controller 33 prohibits the electric motor 31 from being driven even when the user operates the operation member 50 to the ON position and the detection signal is transmitted from the switch 41 to the controller 33. Whether the side handle 300 is attached is detected using a single sensor 70, which will be described below. In the following description, a configuration for this detection will be described in detail with reference to the drawings.

As illustrated in FIG. 4, the grinder 10 includes a first intermediate member 60 and the sensor 70. The first intermediate member 60 has a generally annular shape, and is disposed so as to surround the outer periphery of the hollow circular cylindrical portion 21 of the gear housing 20 (refer to FIGS. 4, 6, and 7). The first intermediate member 60 is supported on the hollow circular cylindrical portion 21 in a state of being retained by a circlip 69 (refer to FIGS. 6 and 7). According to such an arrangement, the grinder 10 does not have to include a special member to support the first intermediate member 60, and can be configured with a compact size.

The first intermediate member 60 is configured to be pressed and displaced by the attachment portion 320 of the side handle 300 by the attachment of the side handle 300 to any of the first attachment portions 29*a* to 29*c*. The first intermediate member 60 is rotated about the rotational axis AX1 by a predetermined angle as such a displacement motion in the present embodiment. The position of the first intermediate member 60 when the side handle 300 is attached to none of the first attachment portions 29*a* to 29*c* of the gear housing 20 will be referred to as a non-attachment position (refer to FIGS. 6 and 7). The position of the first intermediate member 60 when the side handle 300 is attached to any of the first attachment portions 29*a* to 29*c* will be referred to as an attachment position (refer to FIGS. 8 and 9).

Figure 5:
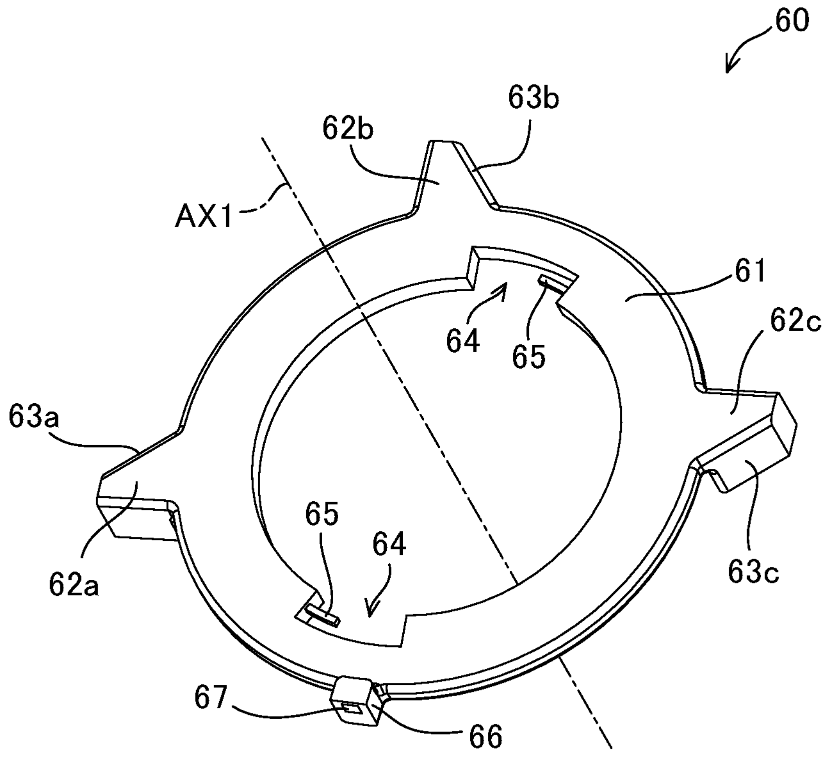
FIG. 5 is a perspective view of a first intermediate member.

As illustrated in FIG. 5, the first intermediate member 60 is a single member, and is provided in common for the first attachment portions 29*a* to 29*c*. The first intermediate member 60 includes a first intermediate member main body 61. The first intermediate member main body 61 has an annular shape centered at the rotational axis AX1 of the electric motor 31 in the present embodiment. However, the first intermediate member 60 may have a partially annular shape (i.e., an unclosed annular shape). A through-hole is formed at the central portion of the first intermediate member main body 61. The hollow circular cylindrical portion 21 extends through this through-hole.

The first intermediate member 60 further includes three pressed portions 62*a* to 62*c*. The three pressed portions 62*a* to 62*c* are disposed so as to be circumferentially spaced apart from each other. The pressed portion 62*a* is a portion pressed by the side handle 300 (more specifically, the distal end of the attachment portion 320) when the side handle 300 is attached to the first attachment portion 29*a* of the gear housing 20. Similarly, the pressed portion 62*b* is a portion pressed by the side handle 300 when the side handle 300 is attached to the first attachment portion 29*b*, and the pressed portion 62*c* is a portion pressed by the side handle 300 when the side handle 300 is attached to the first attachment portion 29*c*. Therefore, the pressed portions 62*a* to 62*c* are disposed at angular positions corresponding to the angular positions of the first attachment portions 29*a* to 29*c*, respectively (refer to FIGS. 6 and 7).

Each of the pressed portions 62*a* to 62*c* protrudes radially outward from the first intermediate member main body 61. Therefore, the first intermediate member 60 is easily shaped so as to be pressed by the side handle 300. Further, the diameter of the first intermediate member main body 61 can be reduced.

Figure 6:
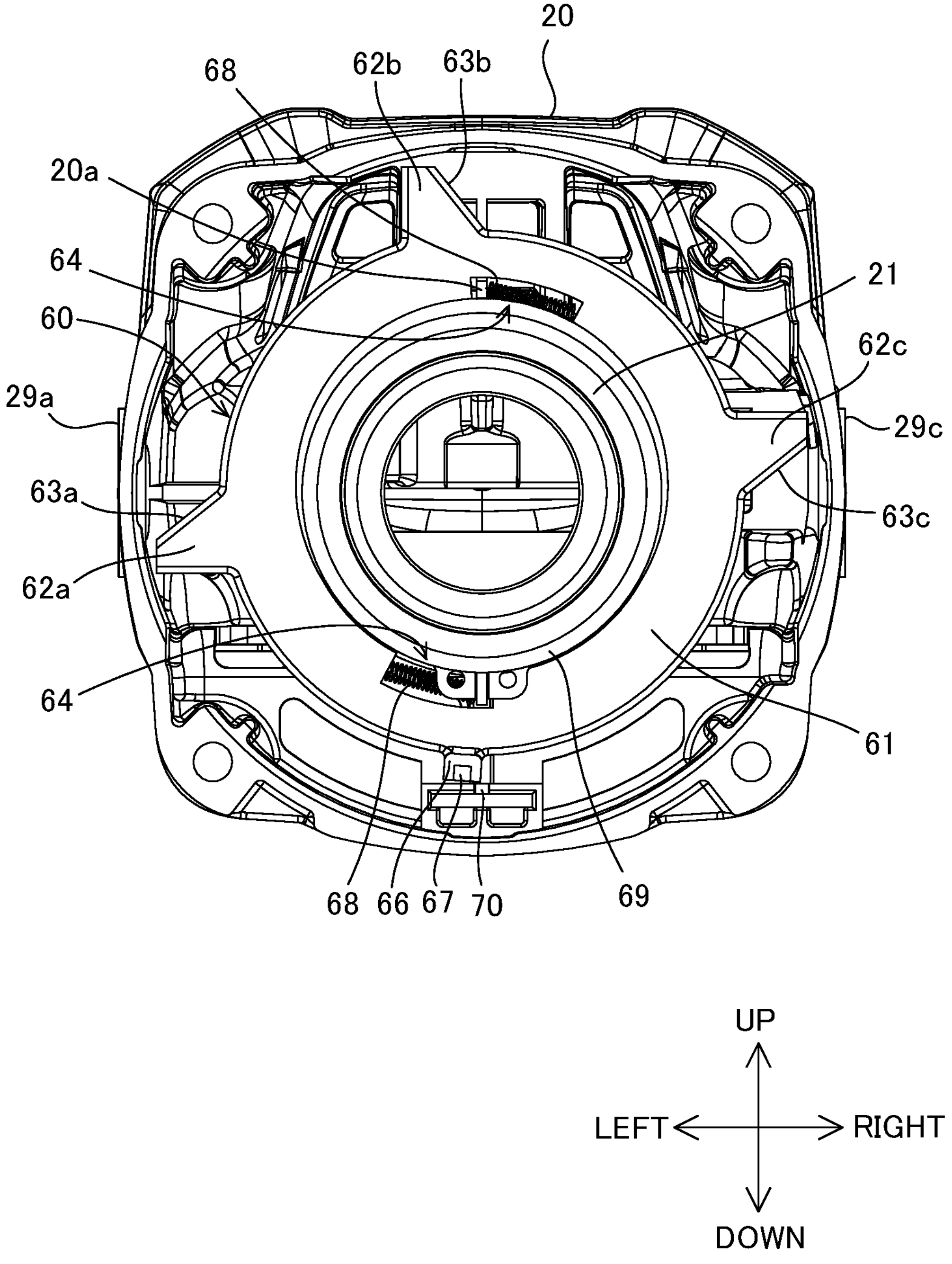
FIG. 6 illustrates the internal structure of the grinder, and illustrates the state in which the side grip is detached.
Figure 7:
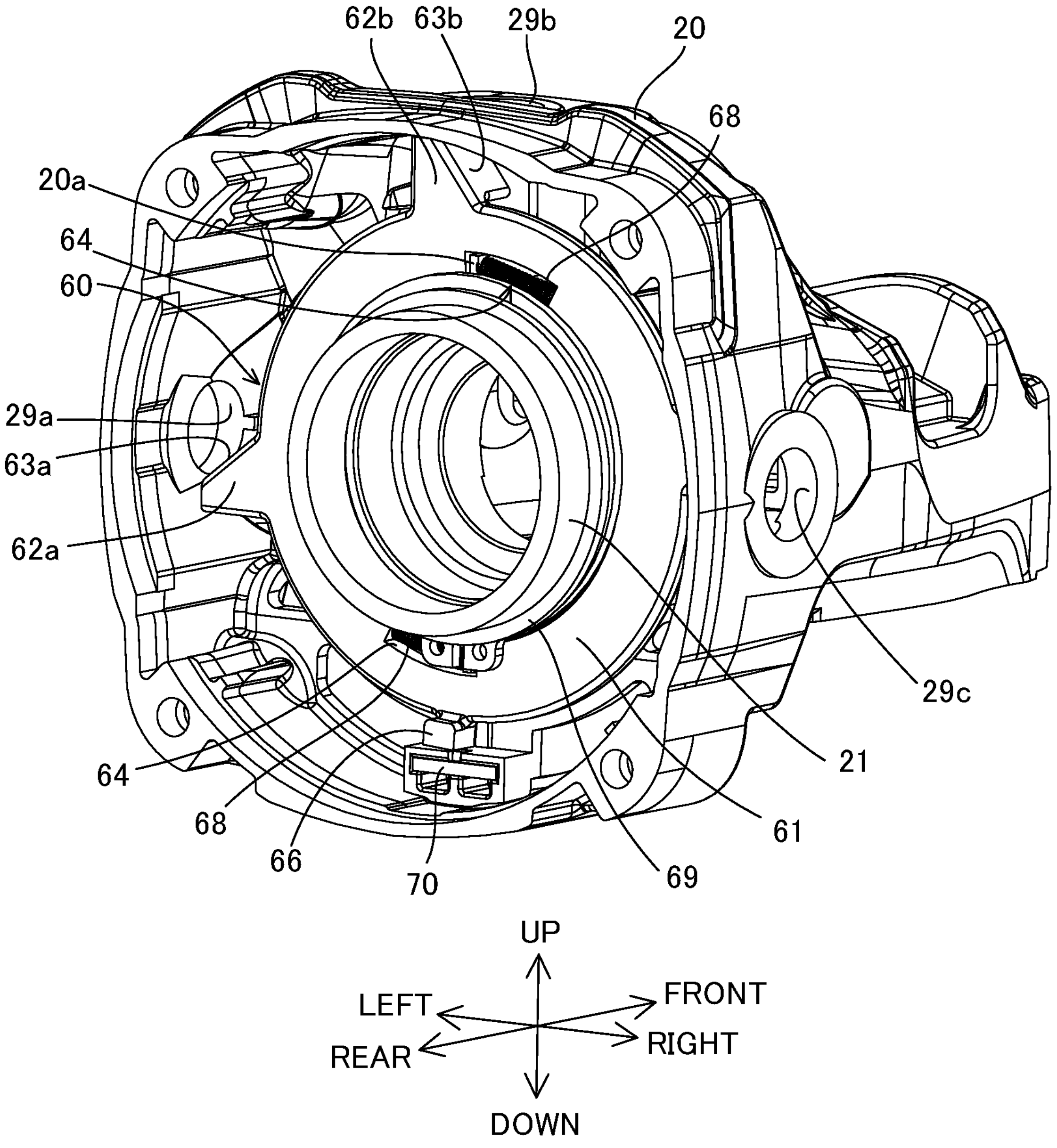
FIG. 7 is a perspective view illustrating the internal structure of the grinder, and illustrates the state in which the side grip is detached.

As illustrated in FIGS. 6 and 7, the pressed portion 62*a* includes a pressed surface 63*a* angled with respect to a direction in which the through-hole forming the first attachment portion 29*a* extends (i.e., a direction in which the side handle 300 is attached, or a direction in which the side handle 300 presses the pressed portion 62*a* when the side handle 300 is attached to the first attachment portion 29*a*). Similarly, the pressed portion 62*b* includes a pressed surface 63*b* angled with respect to a direction in which the through-hole forming the first attachment portion 29*b* extends. Similarly, the pressed portion 62*c* includes a pressed surface 63*c* angled with respect to a direction in which the through-hole forming the first attachment portion 29*c* extends. In the present embodiment, the pressed surfaces 63*a* to 63*c* are angled at approximately 45 degrees with respect to the directions in which the side handle 300 presses the pressed portions 62*a* to 62*c*, respectively (refer to FIG. 6). This angle can be set to any angle so as to allow the first intermediate member 60 to be displaced in a direction different from the directions in which the side handle 300 presses the pressed portions 62*a* to 62*c*. In an alternative embodiment, this angle may be set within a range of 30 degrees or larger and 60 degrees or smaller. According to the pressed surfaces 63*a* to 63*c* angled in this manner, the first intermediate member 60 can be easily rotated. Further, the pressed surfaces 63*a* to 63*c* extend to positions at which they protrude forward beyond the first intermediate member main body 61. This configuration allows the pressed surfaces 63*a* to 63*c* and the attachment portion 320 of the side handle 300 to contact each other over wider areas, and therefore can ensure that the pressed surfaces 63*a* to 63*c* are pressed by the side handle 300.

Figure 8:
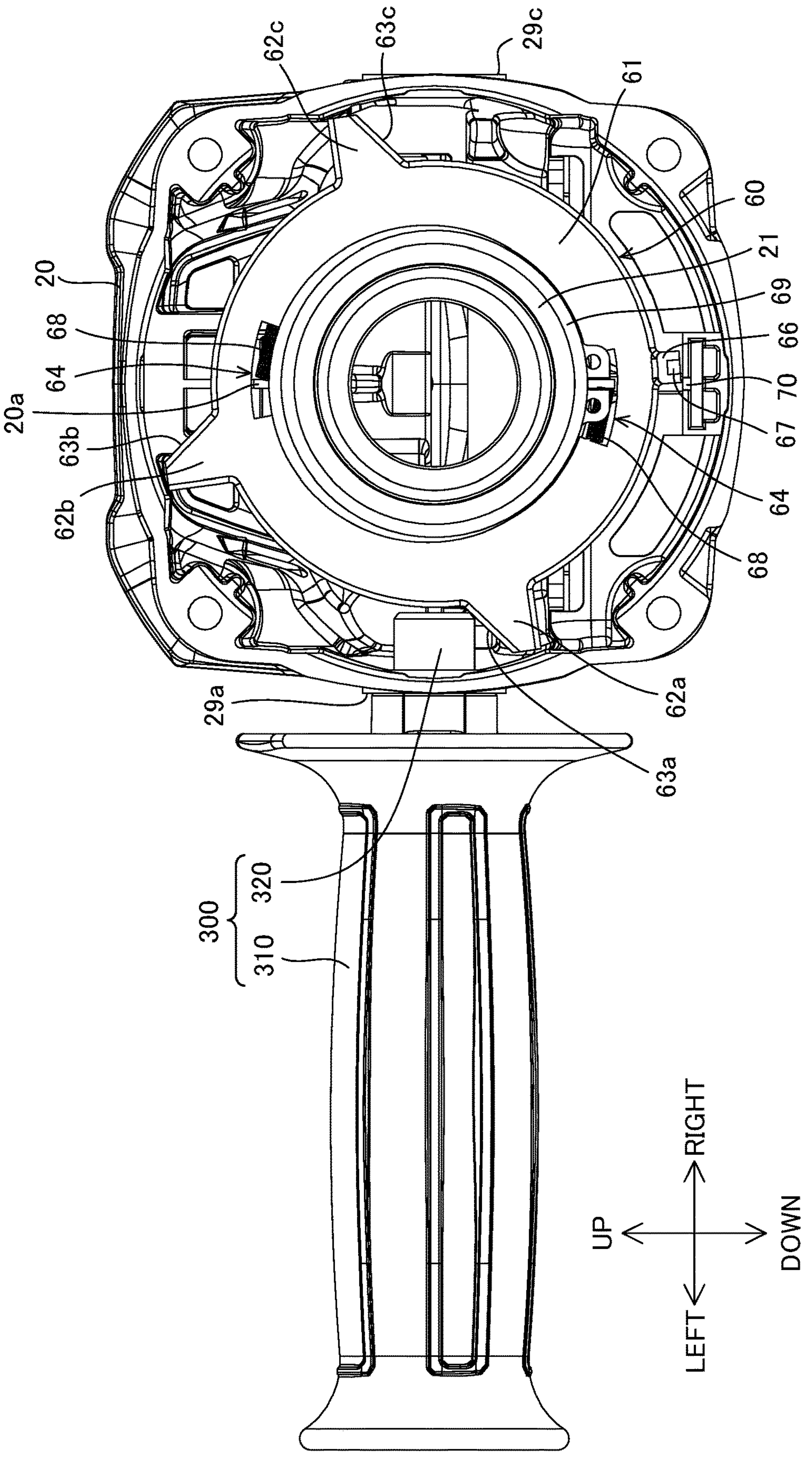
FIG. 8 illustrates the internal structure of the grinder, and illustrates the state in which the side grip is attached.
Figure 9:
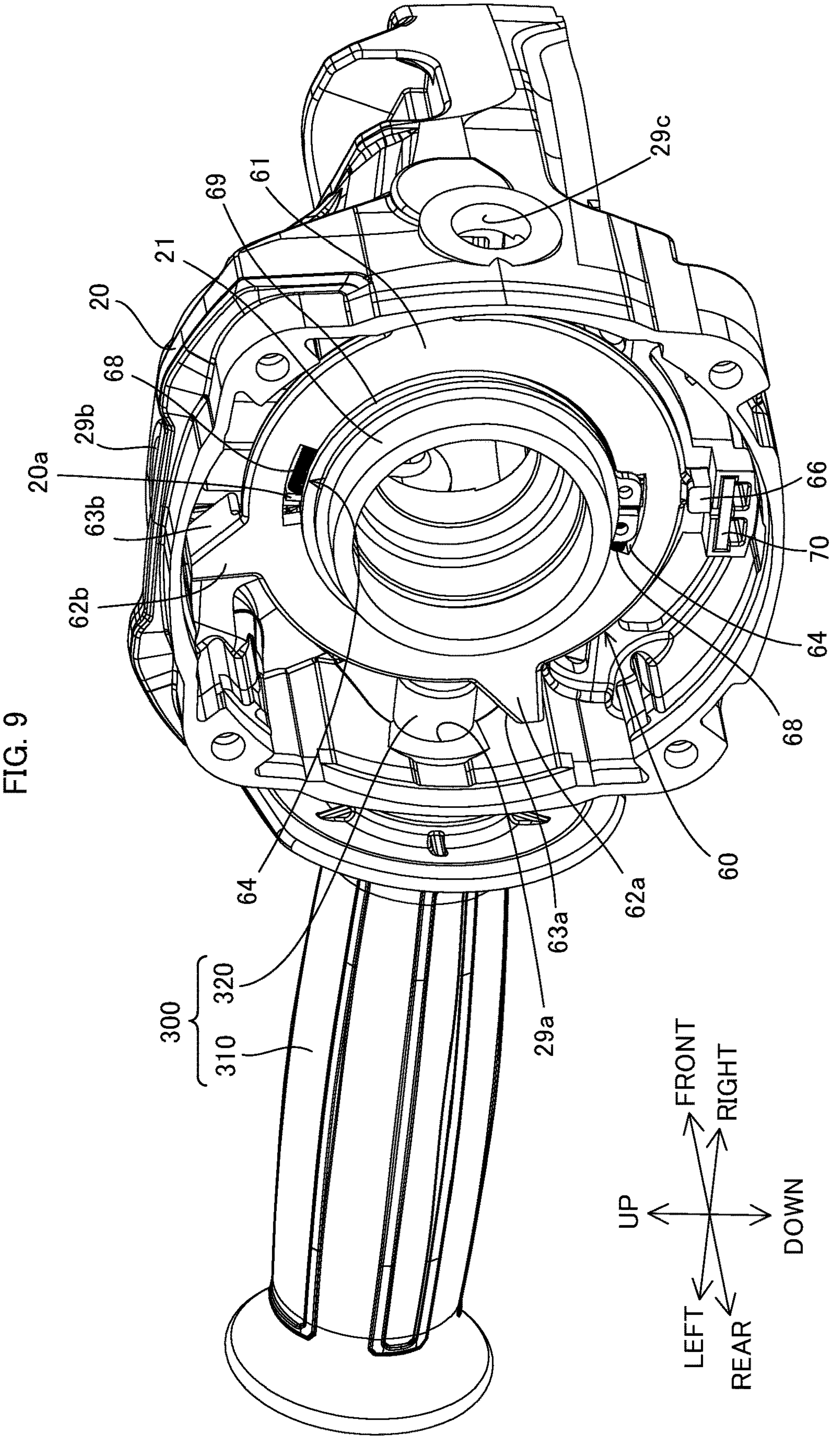
FIG. 9 is a perspective view illustrating the internal structure of the grinder, and illustrates the state in which the side grip is attached.

A comparison between FIGS. 6 and 7 and FIGS. 8 and 9 makes it understandable that, due to the attachment of the side handle 300 to the first attachment portion 29*a*, the pressed surface 63*a* of the pressed portion 62*a* is pressed by the attachment portion 320 of the side handle 300, and the first intermediate member 60 is rotated in the counterclockwise direction from the position illustrated in FIGS. 6 and 7 to the position illustrated in FIGS. 8 and 9.

As illustrated in FIG. 5, the first intermediate member 60 further includes a magnet 67 and a magnet holding portion 66 that holds the magnet 67. The magnet 67 is provided to detect the above-described displacement of the first intermediate member 60 (i.e., the rotational motion) using the sensor 70. Accordingly, the sensor 70 is a magnetic sensor in the present embodiment.

As illustrated in FIGS. 4 and 6, the sensor 70 is fixed to the gear housing 20 near the lower edge of the gear housing 20 in the vertical direction. Further, the sensor 70 is fixed to the gear housing 20 near the rear edge of the gear housing 20 at approximately the same position as the first intermediate member 60 in the front-rear direction. The sensor 70 is connected to the controller 33 via a signal line laid at the bottom portion of the motor housing 30 along the front-rear direction. A result of the detection by the sensor 70 is output to the controller 33. When the controller 33 and the sensor 70 are arranged in such a manner that the controller 33 and the sensor 70 are located near the lowermost portion of the grinder 10 and the electric motor 31 is interposed between the controller 33 and sensor 70, like the present embodiment, the grinder 10 can be configured with little size increase and further with efficient wiring.

In conformity with this position of the sensor 70, the magnet holding portion 66 is provided near the lowermost portion of the first intermediate member main body 61 (refer to FIG. 6). As illustrated in FIG. 5, the magnet holding portion 66 has a generally cuboidal shape, and protrudes from the first intermediate member main body 61 outward in the radial direction around the rotational axis AX1. The magnet holding portion 66 holds the magnet 67 in such a manner that the magnet 67 and the sensor 70 face each other vertically.

Due to this configuration, the sensor 70 can detect a difference in the position of the magnet 67 due to the attachment or no attachment of the side handle 300. In other words, the sensor 70 can detect whether the first intermediate member 60 is located at the non-attachment position illustrated in FIGS. 6 and 7 or located at the attachment position illustrated in FIGS. 8 and 9. The sensor 70 and the magnet 67 may be configured in such a manner that the sensor 70 detects a magnetic field only when the first intermediate member 60 is located at the non-attachment position. Alternatively, the sensor 70 and the magnet 67 may be configured in such a manner that the sensor 70 detects a magnetic field only when the first intermediate member 60 is located at the attachment position. Alternatively, the sensor 70 and the magnet 67 may be configured in such a manner that the sensor 70 detects a magnetic field when the first intermediate member 60 is moved between the attachment position and the non-attachment position and the magnet 67 passes over the sensor 70.

The magnet holding portion 66 protrudes radially outward from the first intermediate member main body 61 as described above, and therefore the distance from the rotational axis of the first intermediate member main body 61 (i.e., the rotational axis AX1) to the magnet 67 can be increased. Therefore, the present configuration leads to an increase in the displacement amount of the magnet 67 with respect to the same rotational angle of the first intermediate member main body 61, thereby easily securing the detection accuracy of the sensor 70. Further, the magnet 67 is provided at a circumferentially different position from the pressed portions 62*a* to 62*c*, and therefore the layout flexibility of the sensor 70 is improved. As a result, the sensor 70 can be arranged in the above-described manner, and thus the grinder 10 can be configured with little size increase. However, the layout of the magnet 67 and the sensor 70 can be set in any manner. For example, the magnet 67 may be held on the first intermediate member main body 61 or may be held on one of the pressed portions 62*a* to 62*c*.

As illustrated in FIG. 5, the first intermediate member 60 further includes two cutout portions 64. The cutout portions 64 are portions partially cut out along the circumferential direction. The two cutout portions 64 are disposed rotationally symmetrically by 180 degrees with respect to the rotational axis AX1. The cutout portions 64 are located on the inner peripheral side of the first intermediate member main body 61 in the present embodiment, but may be located on the outer peripheral side of the first intermediate member main body 61.

At each of the two cutout portions 64, a protrusion 65 generally circumferentially extends from the circumferential side surface of the first intermediate member main body 61 that forms the cutout portion 64 in a direction from the non-attachment position toward the attachment position. The protrusion 65 is provided to hold a spring 68 as a biasing member within the cutout portion 64 as illustrated in FIGS. 6 to 9. The spring 68 is in the form of a coil spring, and is disposed so as to surround the protrusion 65. One end of the spring 68 is seated on the circumferential side surface of the first intermediate member main body 61 that forms the cutout portion 64 (the side surface closer to the proximal end of the protrusion 65). The other end of the spring 68 is seated on a spring seat 20*a* of the gear housing 20. The spring seat 20*a* extends rearward from the front side of the gear housing 20 as far as a position inside the cutout portion 64 (only the spring seat 20*a* corresponding to the upper cutout portion 64 is visible in FIGS. 6 to 9).

The spring 68 biases the first intermediate member 60 in the direction from the attachment position toward the non-attachment position. Therefore, the first intermediate member 60 is rotated in the counterclockwise direction from the non-attachment position to the attachment position against the biasing force of the spring 68 when the side handle 300 is attached, but automatically returns from the attachment position to the non-attachment position under the biasing force of the spring 68 when the side handle 300 is detached. Disposing the spring 68 in the cutout portion 64 can prevent a size increase of the grinder 10 due to securing a space for installing the biasing member.

According to the above-described grinder 10, the single first intermediate member 60 provided in common for the first attachment portions 29*a* to 29*c* is displaced (rotated) regardless of which first attachment portion of the first attachment portion 29*a*, 29*b*, or 29*c* is used to attach the side handle 300. Then, the single sensor 70 can detect this displacement of the first intermediate member 60. This eliminates the necessity of mounting a sensor for detecting whether the side handle 300 is attached for each of the first attachment portions 29*a* to 29*c*, and therefore can reduce the number of sensors.

B. Second Embodiment

Figure 10:
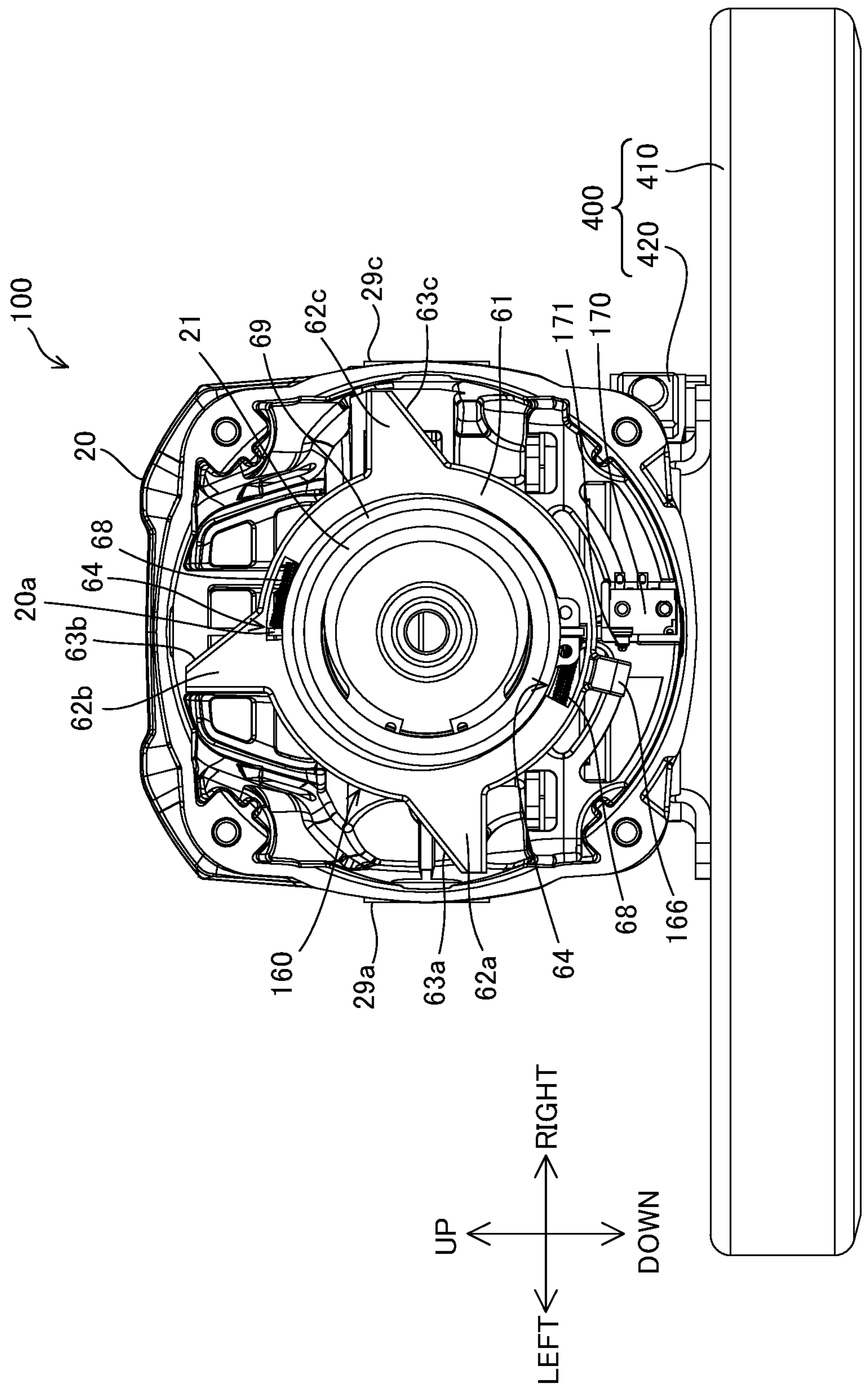
FIG. 10 illustrates the internal structure of a grinder according to a second embodiment of the present invention, and illustrates the state in which the side grip is detached.
Figure 11:
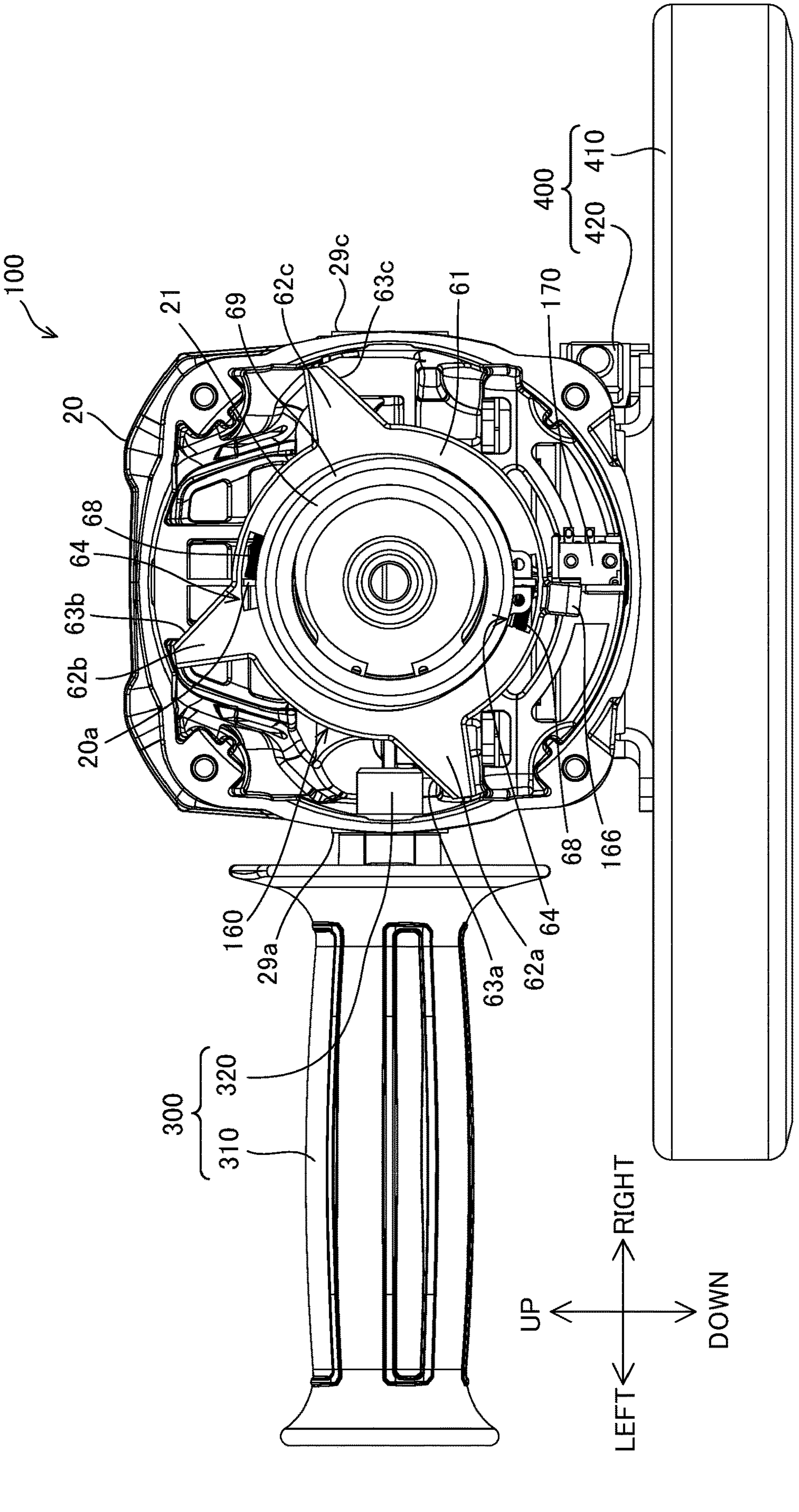
FIG. 11 illustrates the internal structure of the grinder according to the second embodiment, and illustrates the state in which the side grip is attached.

Next, a second embodiment of the present invention will be described with reference to FIGS. 10 to 12. A grinder 100 according to the second embodiment is different from the first embodiment only in terms of including a first intermediate member 160 and a sensor 170 instead of the first intermediate member 60 and the sensor 70 according to the first embodiment. In the following description, the second embodiment will be described focusing only on differences from the first embodiment. In FIGS. 10 and 11, similar components to the first embodiment are identified by the same reference numerals as the first embodiment, and the descriptions thereof will be omitted.

As illustrated in FIGS. 10 and 11, the sensor 170 is fixed to the gear housing 20 near the lower edge of the gear housing 20 in the vertical direction. Further, the sensor 170 is fixed to the gear housing 20 near the rear edge of the gear housing 20 at approximately the same position as the first intermediate member 160 in the front-rear direction (not illustrated). The sensor 170 is the form of a microswitch, and includes an actuator portion 171.

Figure 12:
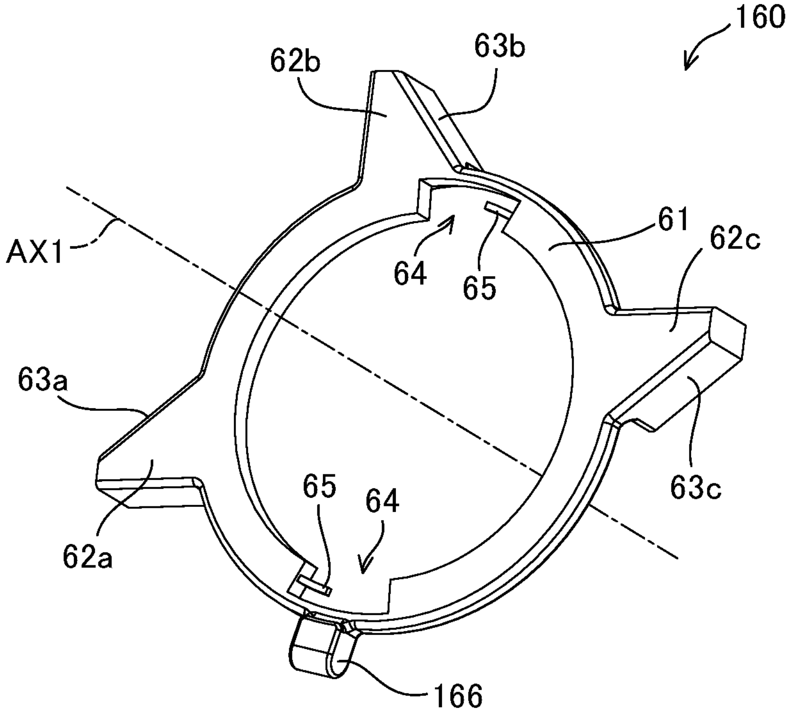
FIG. 12 is a perspective view of a first intermediate member according to the second embodiment.

As illustrated in FIG. 12, the first intermediate member 160 includes a contact portion 166. The contact portion 166 is a portion for contacting the actuator portion 171 of the sensor 170. For this purpose, the contact portion 166 is provided near the lowermost portion of the first intermediate member main body 61 in conformity with the position of the sensor 170. The contact portion 166 is provided at a circumferentially different position from the pressed portions 62*a* to 62*c*, and therefore the layout flexibility of the sensor 170 is improved similarly to the first embodiment. However, the layout of the contact portion 166 and the sensor 170 can be set in any manner.

According to this grinder 100, in the state that the side handle 300 is not attached, the first intermediate member 160 is located at the non-attachment position (FIG. 10), and the contact portion 166 is out of contact with the actuator portion 171. Accordingly, the sensor 170 is in an OFF state. On the other hand, when the side handle 300 is attached and the first intermediate member 160 is rotated to the attachment position (FIG. 11), the contact portion 166 is brought into contact with the actuator portion 171 and the sensor 170 is set into an ON state. In this manner, whether the side handle 300 is attached can be detected using the single sensor 170.

C. Third Embodiment

Next, a third embodiment of the present invention will be described with reference to FIGS. 13 to 20. A grinder 200 according to the third embodiment is different from the first embodiment mainly in terms of including a first intermediate member 260 and a first sensor 270 instead of the first intermediate member 60 and the sensor 70 according to the first embodiment and also detecting whether the cover 400 is attached. In the following description, the third embodiment will be described focusing only on differences from the first embodiment. In FIGS. 13 to 20, similar components to the first embodiment are identified by the same reference numerals as the first embodiment, and the descriptions thereof will be omitted.

Figure 13:
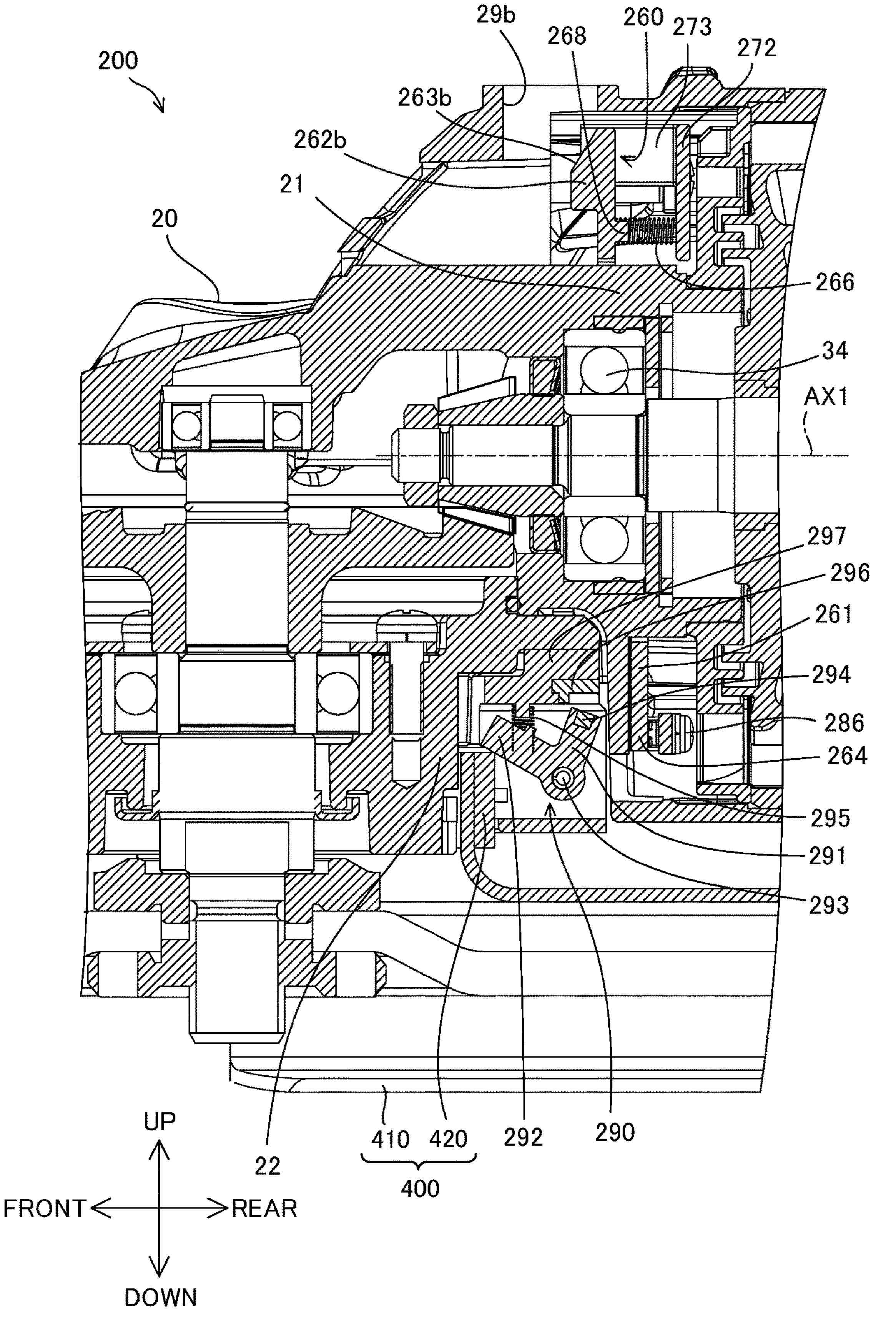
FIG. 13 is a partial vertical cross-sectional view of a grinder according to a third embodiment of the present invention, and illustrates the state in which the side grip is detached.
Figure 14:
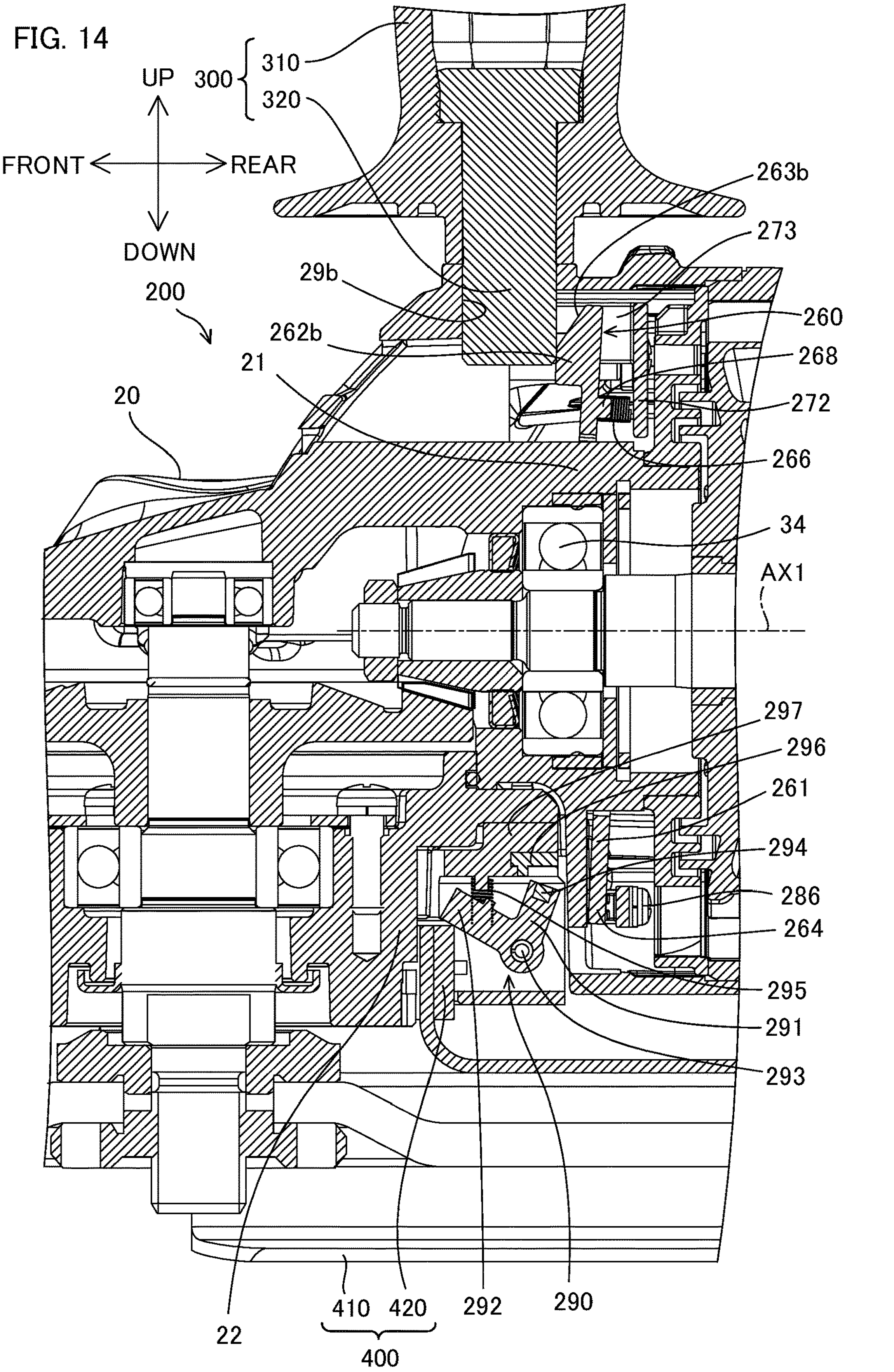
FIG. 14 is a partial vertical cross-sectional view of the grinder according to the third embodiment, and illustrates the state in which the side grip is attached.
Figure 17:
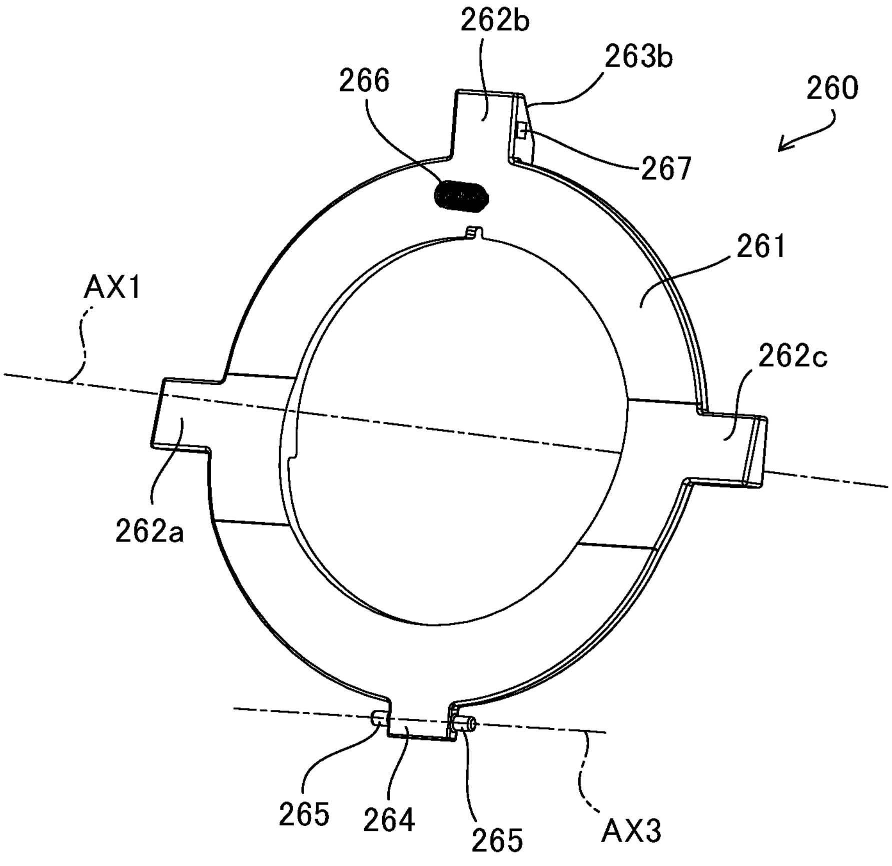
FIG. 17 is a perspective view of a first intermediate member according to the third embodiment.
Figure 20:
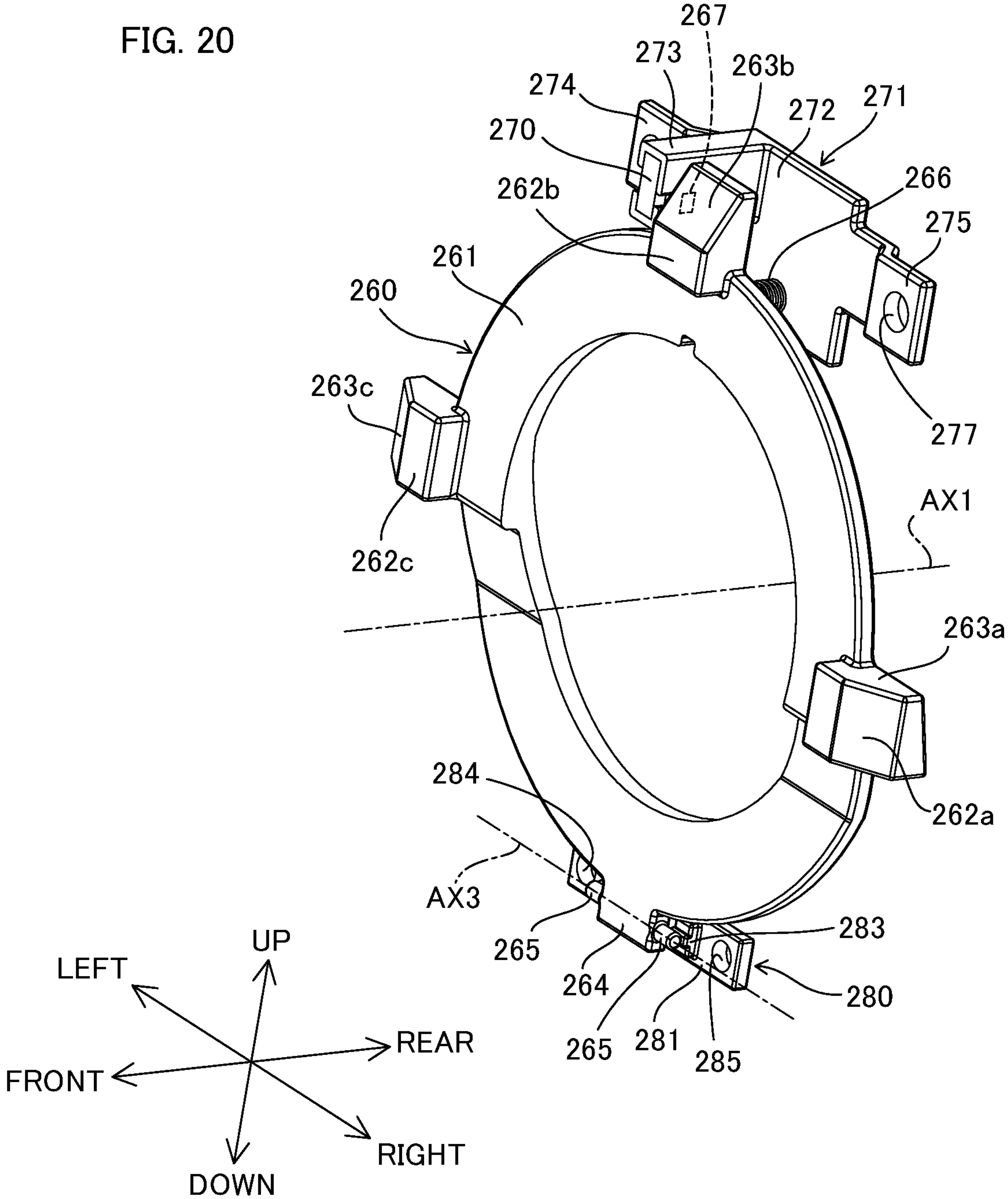
FIG. 20 is a perspective view illustrating the layout of the first intermediate member, the sensor case, and the retaining member.

As illustrated in FIGS. 13 and 14, the first intermediate member 260 is disposed in such a manner that a first intermediate member main body 261 surrounds the outer periphery of the hollow circular cylindrical portion 21, similarly to the first embodiment. Further, as illustrated in FIGS. 17 and 20, the first intermediate member 260 includes the annular first intermediate member main body 261 and pressed portions 262*a* to 262*c* arranged in a distributed manner at the circumferential positions corresponding to the first attachment portions 29*a* to 29*c*, similarly to the first embodiment. Pressed surfaces 263*a* to 263*c* facing forward and radially outward are formed on the pressed portions 262*a* to 262*c*, respectively. The first intermediate member 260 further includes a protrusion portion 264 protruding radially outward from the lowermost portion of the first intermediate member main body 261. A tilt shaft 265 extends in the left-right direction from each of the right surface and the left surface of the protrusion portion 264. The tilt shafts 265 include a tilt axis AX3 extending in the left-right direction. The protrusion portion 264 is located on the radially outer side with respect to the first intermediate member main body 261, and therefore the tilt axis AX3 is also located on the radially outer side with respect to the first intermediate member main body 261.

Figure 19:
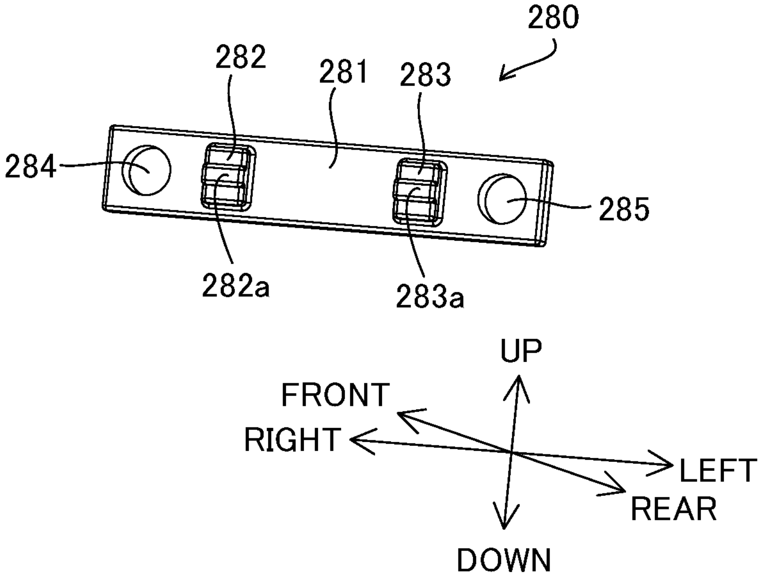
FIG. 19 is a perspective view of a retaining member.

The tilt shaft 265 is mounted to the gear housing 20 using a retaining member 280 so as to allow the first intermediate member 260 to be tilted (i.e., moved pivotally) about the tilt shaft 265. The retaining member 280 includes a main body 281 and protrusion portions 282 and 283 as illustrated in FIG. 19. The main body 281 is shaped like a rectangular flat plate perpendicular to the front-rear direction. The protrusion portions 282 and 283 protrude forward from the front surface of the main body 281, and are disposed so as to be spaced apart from each other in the left-right direction. Semi-circular grooves 282*a* and 283*a* extending in the left-right direction are formed on the protrusion portions 282 and 283, respectively. The main body 281 includes through-holes 284 and 285 at both the ends thereof in the left-right direction. The retaining member 280 is fixed to the gear housing 20 by inserting bolts 286 in screw holes formed on the gear housing 20 so as to place the bolts 286 through the through-holes 284 and 285, and tightening the bolts 286, respectively, as illustrated in FIGS. 15 and 16.

The tilt shaft 265 of the first intermediate member 260 is inserted into a semi-circular groove (not illustrated) formed on the gear housing 20 from the rear side before the retaining member 280 is attached. When the retaining member 280 is attached to the gear housing 20 from the rear side in this state, a circular hole is formed by the semi-circular groove of the gear housing 20 and the grooves 282*a* and 283*a* of the retaining member 280. The tilt shaft 265 is pivotally held in this hole.

As illustrated in FIGS. 13 and 14, the first intermediate member 260 further includes a protrusion 268 extending rearward from the first intermediate member main body 61. The protrusion 268 is located near the pressed portion 262*b*. A spring 266 in the form of a coil spring is disposed around the protrusion 268 in such a manner that the protrusion 268 is inserted inside the spring 266. One end and the other end of the spring 266 are respectively seated on the rear surface of the first intermediate member main body 261 and the front surface of a retaining portion 272 of a sensor case 271, which will be described below. The spring 266 biases the first intermediate member 260 forward.

Figure 15:
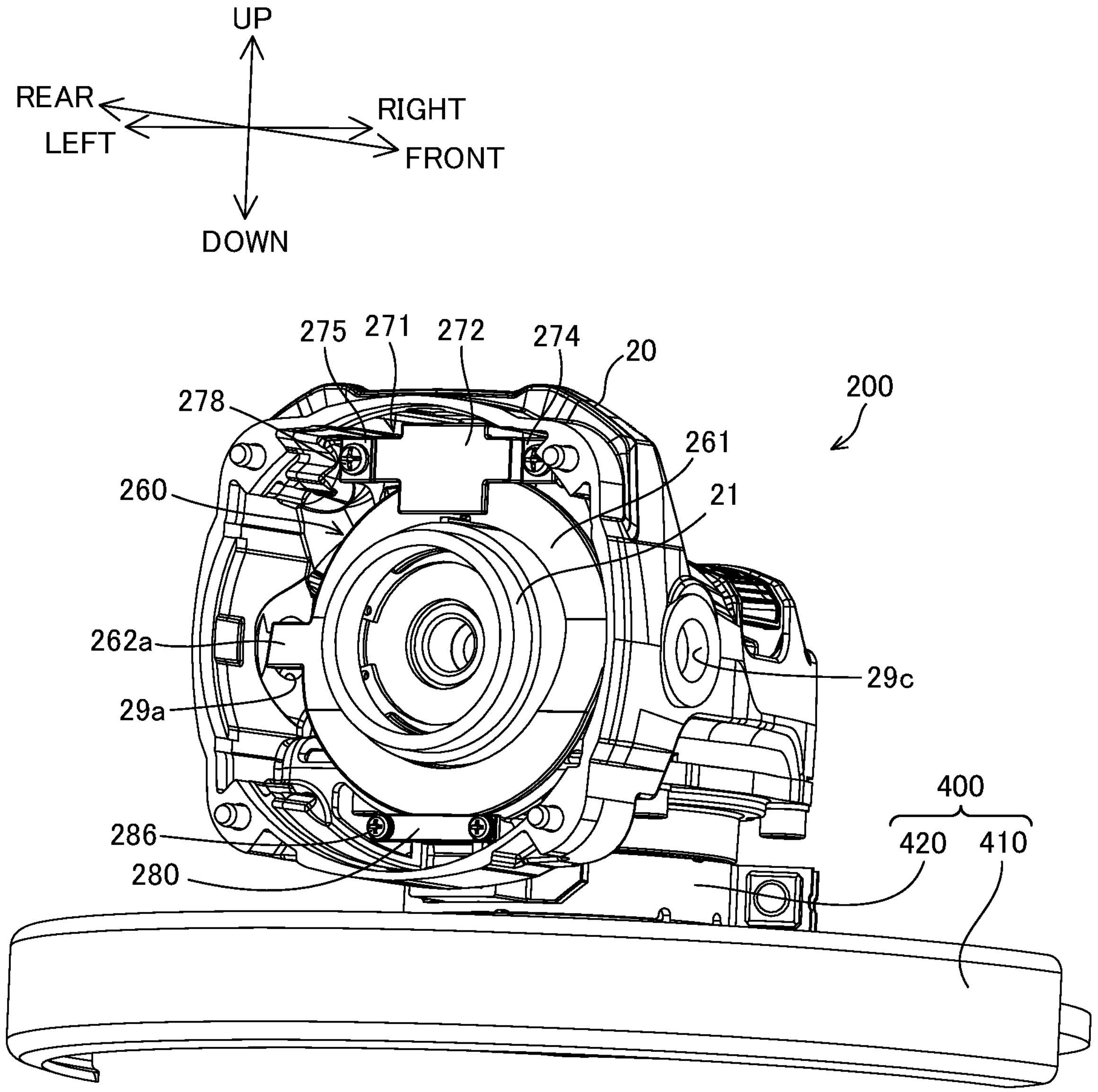
FIG. 15 is a perspective view illustrating the internal structure of the grinder according to the third embodiment, and illustrates the state in which the side grip is detached.
Figure 16:
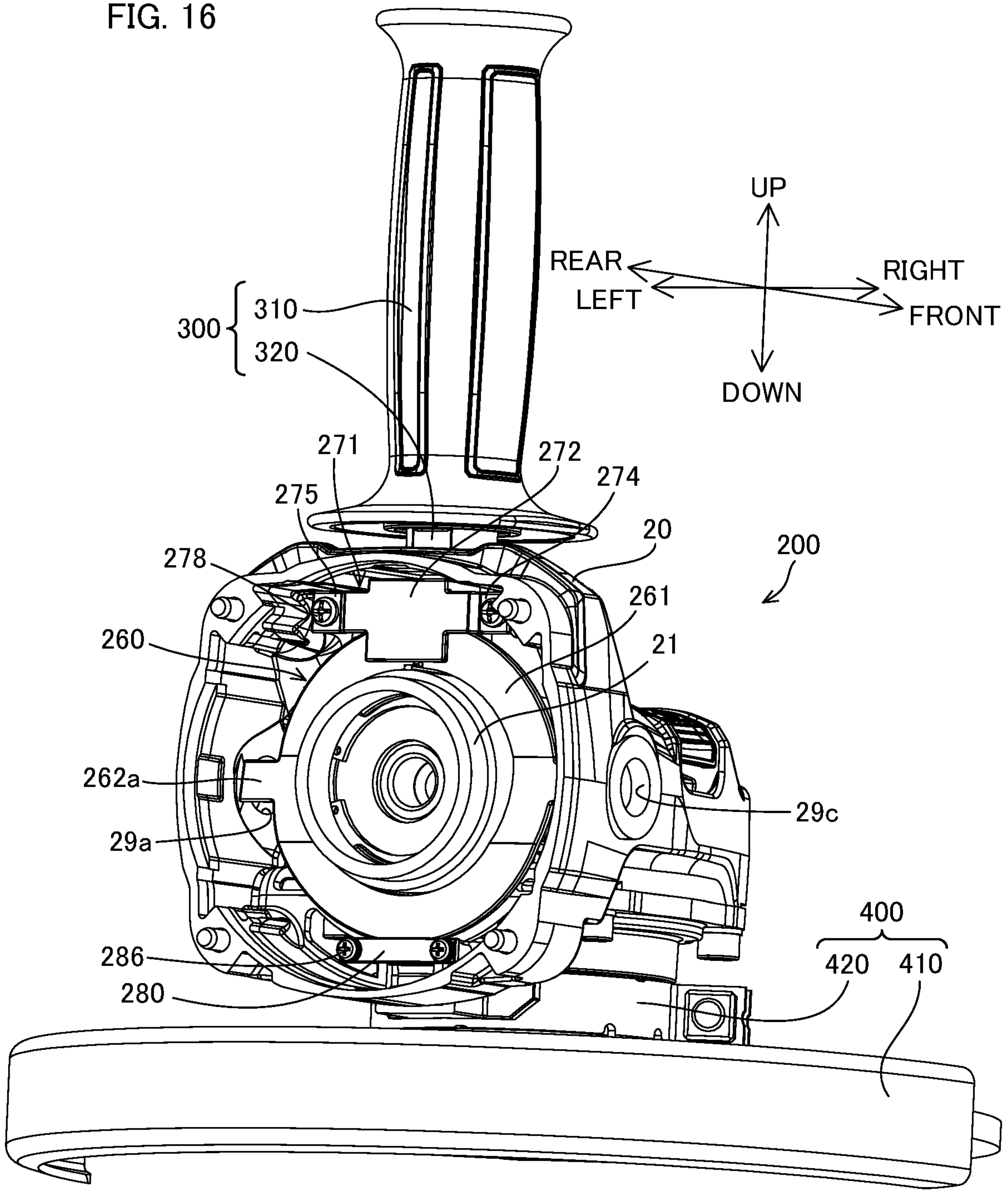
FIG. 16 is a perspective view illustrating the internal structure of the grinder according to the third embodiment, and illustrates the state in which the side grip is attached.

In the state that the side handle 300 is not attached, the first intermediate member 260 is disposed at an angle approximately perpendicular to the rotational axis AX1 in a vertical cross-sectional view as illustrated in FIGS. 13 and 15. On the other hand, when the side handle 300 is attached to any of the first attachment portions 29*a* to 29*c*, one of the pressed surfaces 263*a* to 263*c* corresponding to the attachment portion of the side handle 300 is pressed thereby. All the pressed surfaces 263*a* to 263*c* face forward and radially outward as described above, and therefore receive a rearward force when the side handle 300 is attached from the radially outer side toward the rotational axis AX1. As a result, the first intermediate member 260 is tilted rearward about the tilt shaft 265 against the biasing force of the spring 266 as illustrated in FIGS. 14 and 16. On the other hand, when the side handle 300 is detached, the first intermediate member 260 returns to the position illustrated in FIGS. 13 and 15 under the biasing force of the spring 266.

As illustrated in FIG. 17, a first magnet 267 is held on the right surface of the pressed portion 262*b*. This means that, when the first intermediate member 260 is tilted due to the attachment of the side handle 300, the first magnet 267 held on the first intermediate member 260 is also displaced together. This displacement is detected by the first sensor 270 in the form of a magnetic sensor. In this manner, whether the side handle 300 is attached can be detected using the single first sensor 270. The first magnet 267 is located on the radially outer side with respect to the first intermediate member main body 261 and is positioned generally opposite to the tilt axis AX3 with respect to the first intermediate member main body 261, and therefore the distance from the tilt axis AX3 to the first magnet 267 can be increased. In other words, the present configuration can increase the displacement amount of the first magnet 267 with respect to the same tilt angle of the first intermediate member 260. Therefore, the present configuration can easily secure the detection accuracy of the first sensor 270.

Figure 18:
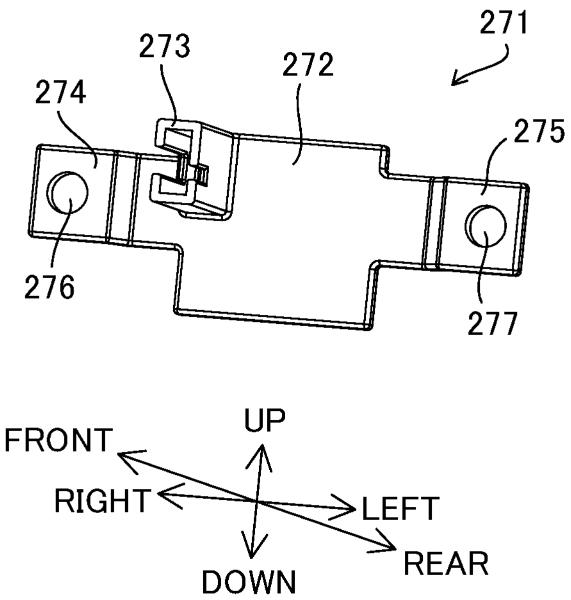
FIG. 18 is a perspective view of a sensor case.

The first sensor 270 is installed in a state of being contained in the sensor case 271 as illustrated in FIG. 20. As illustrated in FIG. 18, the sensor case 271 includes a retaining portion 272, a sensor containing portion 273, and attachment portions 274 and 275. The retaining portion 272 is shaped like a rectangular flat plate perpendicular to the front-rear direction. The retaining portion 272 supports the rear end of the spring 266 as illustrated in FIGS. 13, 14, and 20. Further, the retaining portion 272 also functions as a retainer of the first intermediate member 260 by being disposed so as to reach the lower side with respect to the upper edge of the first intermediate member main body 261 as illustrated in FIGS. 15 and 16.

The sensor containing portion 273 is located on the upper side and the right side of the retaining portion 272, and has a box-like shape extending forward from the retaining portion 272. The first sensor 270 is contained inside the sensor containing portion 273. The attachment portions 274 and 275 extend rightward and leftward from the right edge and the left edge of the retaining portion 272, respectively. The attachment portions 274 and 275 include through-holes 276 and 277 extending in the front-rear direction, respectively. The sensor case 271 is fixed to the gear housing 20 by inserting bolts 278 in screw holes formed on the gear housing 20 so as to place the bolts 278 through the through-holes 276 and 277, and tightening the bolts 278, respectively, as illustrated in FIGS. 15 and 16.

According to the sensor case 271, the first sensor 270 is held in such a manner that the first sensor 270 and the first magnet 267 face each other in the left-right direction (i.e., a direction in which the tilt axis AX3 extends), as illustrated in FIG. 20. Therefore, a displacement of the first magnet 267 in the front-rear direction can be accurately detected using a magnetic sensor operational for an alternating magnetic field as the first sensor 270. However, the layout of the first sensor 270 and the first magnet 267, and the type of the first sensor 270 are not especially limited. For example, in an alternative embodiment, a unidirectionally operational magnetic sensor may be employed as the first sensor 270 with the first sensor 270 and the first magnet 267 arranged so as to face each other in the front-rear direction.

As illustrated in FIGS. 13 and 14, the grinder 200 further includes a second intermediate member 290, a second magnet 294, and a second sensor 296 to detect whether the cover 400 is attached. The second intermediate member 290 includes a magnet holding portion 291, which holds the second magnet 294, and a pressed portion 292, which is pressed by the attachment portion 420 of the cover 400 when the cover 400 is attached. The magnet holding portion 291 and the pressed portion 292 define a generally L-like shape as viewed from the left-right direction. A through-hole 293 extending in the left-right direction is formed at a connection portion between the magnet holding portion 291 and the pressed portion 292. The magnet holding portion 291 holds the second magnet 294 at the distal end thereof (the edge portion on the opposite side from the above-described connection portion).

The grinder 200 further includes an integrated case 297, which holds the second intermediate member 290 and the second sensor 296. The case 297 has a partially-opened box-like shape, and the second sensor 296 is fixed to the upper inner surface thereof so as to face the second magnet 294. Further, the case 297 has a right surface and a left surface (not illustrated). These right surface and left surface include through-holes extending in the left-right direction, respectively. A pin is inserted so as to extend through these through-holes and the through-hole 293, by which the second intermediate member 290 is held by the case 297 pivotally about this pin. Mounting the second sensor 296 and the second intermediate member 290 to the common integrated case 297 in this manner determines the relative positions of the second sensor 296 and the second intermediate member 290 (more specifically, the second magnet 294), thereby eliminating the necessity of adjusting the relative positions of both of them when the grinder 200 is assembled.

A spring 295 is disposed between the pressed portion 292 and the upper inner surface of the case 297. The spring 295 biases the pressed portion 292 downward. Therefore, in the state that the cover 400 is not attached, the pressed portion 292 extends in a direction approximately in parallel with the front-rear direction in a vertical cross-sectional view (not illustrated). On the other hand, when the cover 400 is attached to the second attachment portion 22 of the gear housing 20, the distal end of the pressed portion 292 is pressed upward by the attachment portion 420 and the second intermediate member 290 is pivotally moved in the clockwise direction against the biasing force of the spring 295 as illustrated in FIGS. 13 and 14. Accordingly, the second magnet 294 is displaced in the front-rear direction. Whether the cover 400 is attached can be detected based on the detection of this displacement using the first sensor 270.

Results of the detection by the first sensor 270 and the second sensor 296 are each output to the controller 33. In the present embodiment, the controller 33 is configured to permit the electric motor 31 to be driven only when the signal input from the first sensor 270 indicates that the side handle 300 is attached and the signal input from the second sensor 296 indicates that the cover 400 is attached. In a state that at least one of the side handle 300 and the cover 400 is not attached, the controller 33 prohibits the electric motor 31 from being driven even when the user operates the operation member 50 to the ON position and the detection signal is transmitted from the switch 41 to the controller 33.

Having described the embodiments of the present invention, the above-described embodiments are intended to facilitate the understanding of the present invention, and are not intended to limit the present invention thereto. The present invention can be modified or improved without departing from the spirit thereof, and includes equivalents thereof. Further, each of the elements described in the claims and the specification can be combined in any manner or omitted in any manner within a range that allows it to remain capable of achieving at least a part of the above-described objects or bringing about at least a part of the advantageous effects.

For example, the above-described shapes and the forms of the components of the grinder 10 are merely examples, and can be changed in any manner as long as the functions of these components can be maintained. For example, the pressed portions 62*a* to 62*c* of the first intermediate member 60 may protrude only forward or rearward instead of protruding radially outward. Alternatively, in the third embodiment, the pressed portion may be one portion continuously extending from the position of the pressed portion 262*a* to the position of the pressed portion 262*c* along the outer periphery of the first intermediate member main body 261.

Further, the first intermediate members 60, 160, and 260 may be indirectly pressed by the side handle 300 when the side handle 300 is attached. More specifically, an additional member that is displaced by being pressed by the side handle 300 may be provided, and the first intermediate members 60, 160, and 260 may be displaced by the additional member. Similarly, the second intermediate member 290 may be indirectly pressed by the cover 400 when the cover 400 is attached.

Further, the configuration including the second intermediate member 290, the second magnet 294, and the second sensor 296 exemplarily cited as the third embodiment may be applied to the first or second embodiment.

Each of the sensors 70, 170, and 270 is not limited to the magnetic sensor or the microswitch, and may be any type of sensor capable of detecting the displacement of the first intermediate member 60, 160, or 260. For example, the sensor may be a photoelectric sensor, an ultrasonic distance sensor, or the like.

Further, the grinders 10, 100, and 200 may include a notification portion for notifying the user that the side handle 300 (or the side handle 300 and the cover 400) is not attached instead of or in addition to the configuration that permits or prohibits the driving of the electric motor 31 according to the attachment state of the side handle 300 (or the side handle 300 and the cover 400). The notification method may be light emission, a sound output, a character display, or a combination of them. For example, the notification portion may include at least one of a light-emitting element such as an LED, a GUI screen, and a speaker.

Further, the above-described embodiments can be applied to not only the grinder 10 but also any tool configured to allow an accessory to be selectively attached to a plurality of portions.

DESCRIPTION OF NUMERALS

10, 100, 200 grinder
20 gear housing
20*a* spring seat
21 hollow circular cylindrical portion
22 second attachment portion
23 small bevel gear
24 large bevel gear
25 spindle
26 inner flange
27 lock nut
28 tool accessory
29*a* to 29*c* first attachment portion
30 motor housing
31 electric motor
32 motor shaft
33 controller
34, 35 bearing
40 handle housing
41 switch
50 operation member
57 lock-off switch
60, 160, 260 first intermediate member
61, 261 first intermediate member main body
62*a* to 62*c*, 262*a* to 262*c* pressed portion
63*a* to 63*c*, 263*a* to 263*c* pressed surface
64 cutout portion
65 protrusion
66 magnet holding portion
67 magnet
68 spring
69 circlip
70, 170 sensor
166 contact portion
171 actuator portion
264 protrusion portion
265 tilt axis
266 spring
267 first magnet
268 protrusion
270 first sensor
271 sensor case
272 retaining portion
273 sensor containing portion
274, 265 attachment portion
276, 267 through-hole
278 bolt
280 retaining member
281 main body
282, 283 protrusion portion
282*a*, 283*a* groove
284, 285 through-hole
286 bolt
290 second intermediate member
291 magnet holding portion
292 pressed portion
293 through-hole
294 second magnet
295 spring
296 second sensor
297 case
300 side handle
310 grip portion
320 attachment portion
400 cover
410 cover main body
420 attachment portion
421, 422 flange
423 bolt
AX1, AX2 rotational axis
AX3 tilt axis

The invention claimed is:

1. A tool comprising:

a first accessory;

at least two first attachment portions for detachably and selectively attaching the first accessory;

a single first intermediate member provided in common for the at least two first attachment portions, the first intermediate member including at least one pressed portion configured to be directly or indirectly pressed by the first accessory when the first accessory is attached to one first attachment portion arbitrarily selected from the at least two first attachment portions, and to be directly or indirectly pressed by the first accessory when the first accessory is attached to another first attachment portion arbitrarily selected from the at least two first attachment portions, the first intermediate member being configured to be displaced when the at least one pressed portion is pressed; and a single first sensor configured to detect that the first intermediate member is displaced.

2. The tool according to claim 1, further comprising a biasing member configured to bias the first intermediate member toward a position at which the first intermediate member is located when being not pressed directly or indirectly by the first accessory.

3. The tool according to claim 1, wherein the at least one pressed portion includes a pressed surface angled with respect to a pressing direction in such a manner that the first intermediate member is displaced in a direction different from the pressing direction, the pressing direction being a direction in which the first accessory directly or indirectly presses the at least one pressed portion.

4. The tool according to claim 1, wherein the first intermediate member includes a first intermediate member main body having an annular shape or a partially annular shape, and the at least two first attachment portions are disposed at positions spaced apart from each other in a circumferential direction of the annular shape or the partially annular shape, respectively.

5. The tool according to claim 4, wherein the at least one pressed portion includes pressed portions respectively provided at at least two positions respectively corresponding to the positions of the at least two first attachment portions.

6. The tool according to claim 4, wherein the at least one pressed portion protrudes radially outward from the first intermediate member main body.

7. The tool according to claim 4, wherein the first intermediate member is configured to be rotated in the circumferential direction when the at least one pressed portion is pressed.

8. The tool according to claim 7, further comprising a biasing member configured to bias the first intermediate member toward a position at which the first intermediate member is located when being not pressed directly or indirectly by the first accessory, wherein the first intermediate member main body includes a cutout portion partially cut out along the circumferential direction, and the biasing member is contained in the cutout portion.

9. The tool according to claim 4, wherein the first intermediate member includes a tilt axis, and is configured to be tilted about the tilt axis when the at least one pressed portion is pressed.

10. The tool according to claim 1, wherein the first intermediate member includes a first magnet and a magnet holding portion that holds the first magnet, and the first sensor is a magnetic sensor configured to detect a displacement of the first magnet.

11. The tool according to claim 10, wherein the first intermediate member includes a first intermediate member main body having an annular shape or a partially annular shape, the at least two first attachment portions are disposed at positions spaced apart from each other in a circumferential direction of the annular shape or the partially annular shape, respectively, the first intermediate member is configured to be rotated in the circumferential direction when the at least one pressed portion is pressed, and the magnet holding portion protrudes radially outward from the first intermediate member main body.

12. The tool according to claim 11, wherein the magnet holding portion is provided at a position different from the at least one pressed portion in the circumferential direction.

13. The tool according to claim 10, wherein the first intermediate member includes a first intermediate member main body having an annular shape or a partially annular shape, the at least two first attachment portions are disposed at positions spaced apart from each other in a circumferential direction of the annular shape or the partially annular shape, respectively, the first intermediate member includes a tilt axis, and is configured to be tilted about the tilt axis when the at least one pressed portion is pressed, the tilt axis is located on a radially outer side with respect to the first intermediate member main body, and the first magnet is disposed on the radially outer side with respect to the first intermediate member main body and at a position generally opposite to the tilt axis with respect to the first intermediate member main body.

14. The tool according to claim 1, wherein the first sensor is a microswitch, and the first intermediate member includes a contact portion for contacting the microswitch to bring the microswitch into an ON state when the first intermediate member is displaced.

15. The tool according to claim 14, wherein the at least one pressed portion includes pressed portions respectively provided at at least two positions respectively corresponding to positions of the at least two first attachment portions, and the contact portion is provided at a position different from the at least two positions respectively corresponding to the positions of the at least two first attachment portions in a circumferential direction.

16. The tool according to claim 1, further comprising:

a second accessory;

a second attachment portion for detachably attaching the second accessory;

a second intermediate member configured to, when the second accessory is attached to the second attachment portion, be pivotally moved by being directly or indirectly pressed by the second accessory; and a second sensor configured to detect that the second intermediate member is pivotally moved.

17. The tool according to claim 16, further comprising:

an electric motor; and a controller configured to control driving of the electric motor, wherein the controller is configured to:

permit the electric motor to be driven when both a first condition and a second condition are satisfied, the first condition being a condition that the first sensor detects that the first accessory is attached to any of the at least two first attachment portions, the second condition being a condition that the second sensor detects that the second accessory is attached to the second attachment portion; and prohibit the electric motor from being driven when at least one of the first condition and the second condition is not satisfied.

18. The tool according to claim 17, further comprising a bearing configured to rotatably support a motor shaft of the electric motor; and a housing including a hollow circular cylindrical portion containing and supporting the bearing, wherein the first intermediate member includes a first intermediate member main body having an annular shape or a partially annular shape, the at least two first attachment portions are disposed at positions spaced apart from each other in a circumferential direction of the annular shape or the partially annular shape, respectively, and the first intermediate member is disposed in such a manner that the first intermediate member main body surrounds an outer periphery of the hollow circular cylindrical portion.

19. The tool according to claim 18, wherein the tool is a grinder including a tool accessory configured to be rotated by the electric motor, the first accessory is a side grip, and the second accessory is a cover that partially covers the tool accessory.

20. A grinder comprising:

an electric motor;

a tool accessory configured to be rotated by the electric motor;

a side grip;

at least two first attachment portions for detachably and selectively attaching the side grip;

a single first intermediate member provided in common for the at least two first attachment portions, the first intermediate member including a first intermediate member main body having an annular shape or a partially annular shape and at least two pressed portions disposed at at least two positions respectively corresponding to positions of the at least two first attachment portions, the at least two pressed portions being configured to, when the side grip is attached to one first attachment portion arbitrarily selected from the at least two first attachment portions, be directly or indirectly pressed by the side grip, the first intermediate member being configured to be rotated in a circumferential direction of the annular shape or the partially annular shape when any of the at least two pressed portions is pressed;

a biasing member configured to bias the first intermediate member toward a position at which the first intermediate member is located when being not pressed directly or indirectly by the side grip; and a single first sensor configured to detect that the first intermediate member is rotated, wherein the at least two first attachment portions are disposed at the positions spaced apart from each other in the circumferential direction, respectively, and each of the at least two pressed portions includes a pressed surface angled with respect to a pressing direction in such a manner that the first intermediate member is rotated in a direction different from the pressing direction, and wherein each of the at least two pressed portions protrudes radially outward from the first intermediate member main body, the pressing direction being a direction in which the side grip directly or indirectly presses any of the at least two pressed portions.

21. A tool comprising:

a first accessory;

at least two first attachment portions for detachably and selectively attaching the first accessory;

a single first intermediate member provided in common for the at least two first attachment portions, the first intermediate member including at least one pressed portion configured to, when the first accessory is attached to one first attachment portion arbitrarily selected from the at least two first attachment portions, be directly or indirectly pressed by the first accessory, the first intermediate member being configured to be displaced when the at least one pressed portion is pressed; and a single first sensor configured to detect that the first intermediate member is displaced wherein the first sensor is a microswitch, the first intermediate member includes a contact portion for contacting the microswitch to bring the microswitch into an ON state when the first intermediate member is displaced, the at least one pressed portion includes pressed portions respectively provided at at least two positions respectively corresponding to positions of the at least two first attachment portions, and the contact portion is provided at a position different from the at least two positions respectively corresponding to the positions of the at least two first attachment portions in a circumferential direction.

* * * * *